US009162708B2

(12) United States Patent
Matsushita et al.

(10) Patent No.: US 9,162,708 B2
(45) Date of Patent: Oct. 20, 2015

(54) STEERING HANGER ASSEMBLY FOR VEHICLE

(71) Applicant: Honda Motor Co., Ltd., Tokyo (JP)

(72) Inventors: Takeshi Matsushita, Wako (JP); Tatsuya Miura, Wako (JP); Kouzou Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/364,800

(22) PCT Filed: Dec. 7, 2012

(86) PCT No.: PCT/JP2012/081790
§ 371 (c)(1),
(2) Date: Jun. 12, 2014

(87) PCT Pub. No.: WO2013/089034
PCT Pub. Date: Jun. 20, 2013

(65) Prior Publication Data
US 2014/0333094 A1    Nov. 13, 2014

(30) Foreign Application Priority Data

Dec. 15, 2011  (JP) ................................ 2011-274821
Dec. 15, 2011  (JP) ................................ 2011-274927
Dec. 15, 2011  (JP) ................................ 2011-274975

(51) Int. Cl.
*B62D 1/16*     (2006.01)
*B62D 25/14*    (2006.01)
*B62D 1/02*     (2006.01)

(52) U.S. Cl.
CPC ............... *B62D 25/145* (2013.01); *B62D 1/02* (2013.01); *B62D 1/16* (2013.01)

(58) Field of Classification Search
CPC ........... B62D 25/145; B62D 1/02; B62D 1/16
See application file for complete search history.

(56) References Cited

U.S. PATENT DOCUMENTS 6,203,092 B1    3/2001  Yoshinaka
6,250,678 B1    6/2001  Yoshinaka et al.
(Continued)

FOREIGN PATENT DOCUMENTS

DE   102008045914   3/2010
EP       0990578    4/2000
(Continued)

OTHER PUBLICATIONS

International Search Report in PCT/JP2012/081790, date of mailing Mar. 12, 2013.
(Continued)

*Primary Examiner* — Faye M Fleming
(74) *Attorney, Agent, or Firm* — Rankin, Hill & Clark LLP

(57) ABSTRACT

A steering hanger assembly for a vehicle, the steering hanger assembly including a beam structure for supporting a steering column. The beam structure includes a first beam that extends from a right front pillar toward the center of the vehicle width, a second beam that extends from a left front pillar toward the center of the vehicle width and that overlaps the front end of the first beam, and left and right beam connection members that connect the front ends of the first and second beams together. The beam structure is connected by vehicle body connection members also to other vehicle body constituting members of the vehicle body, which are different from the left and right front pillars.

24 Claims, 17 Drawing Sheets

(56) References Cited

U.S. PATENT DOCUMENTS

| | | |
|---|---|---|
| 2010/0052366 A1* | 3/2010 | Schmieder et al. ...... 296/193.02 |
| 2012/0049573 A1* | 3/2012 | Atsumi .................... 296/193.02 |
| 2012/0049574 A1* | 3/2012 | Atsumi et al. ........... 296/193.02 |

FOREIGN PATENT DOCUMENTS

| | | |
|---|---|---|
| EP | 1862379 | 12/2007 |
| JP | 59-109576 | 7/1984 |
| JP | 61-179170 | 11/1986 |
| JP | 9-277961 | 10/1997 |
| JP | 63-30604 | 2/1998 |
| JP | 11-165563 | 6/1999 |
| JP | 2006-327397 | 12/2006 |
| JP | 2008-051237 | 3/2008 |

OTHER PUBLICATIONS

Office Action in JP 2011-274975, date of mailing May 28, 2013.
European Search Report dated Jul. 8, 2015, 7 pages.

* cited by examiner

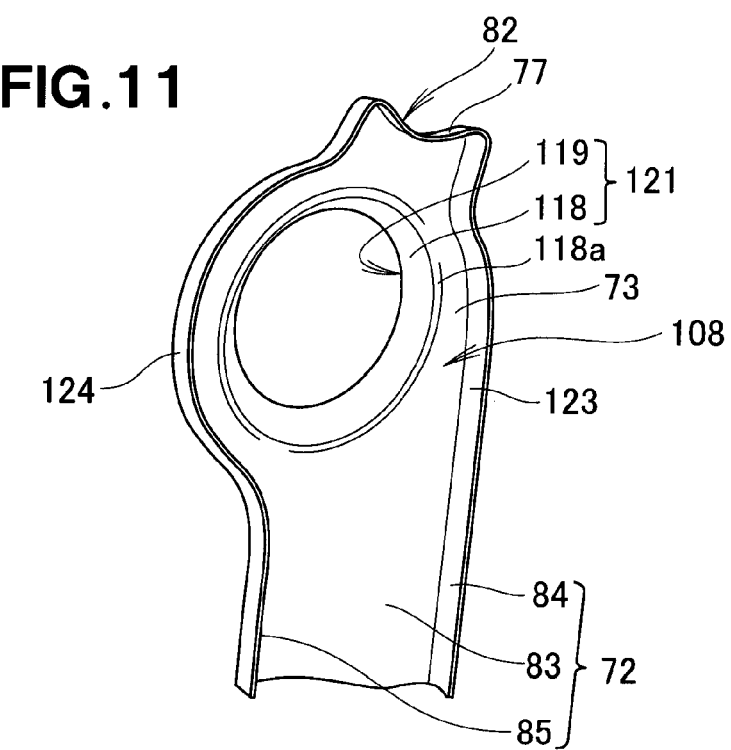
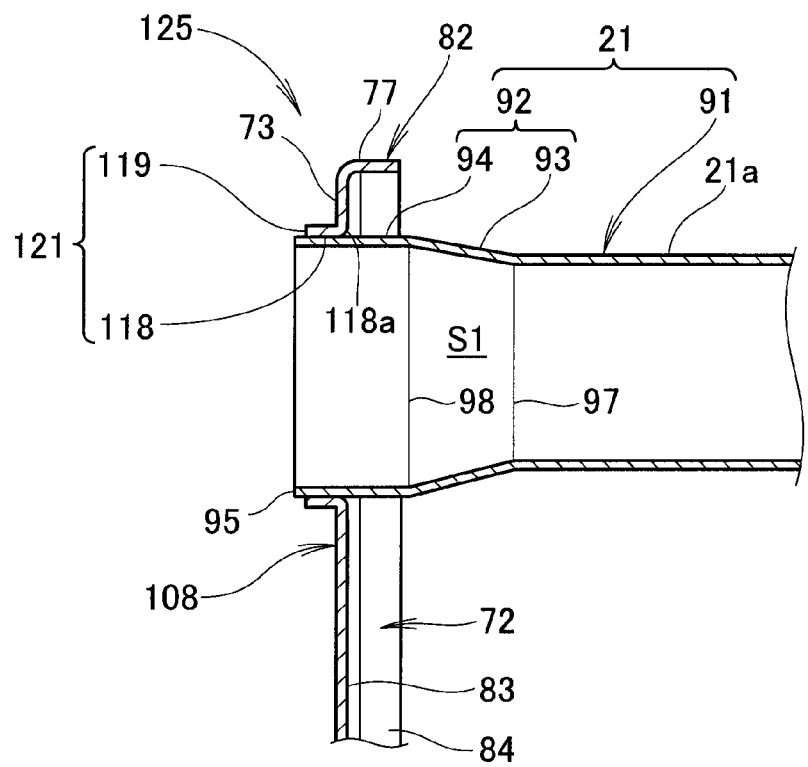

STEERING HANGER ASSEMBLY FOR VEHICLE

TECHNICAL FIELD

The present invention relates to a vehicular steering hanger assembly for supporting a steering column of a steering device.

BACKGROUND ART

A steering hanger assembly for a vehicle is positioned at a rear part of a dashboard between left and right front pillars. Techniques relating to steering hanger assemblies are known from Patent Literature 1 and Patent Literature 2.

The vehicular steering hanger assembly disclosed in Patent Literature 1 is configured so to be substantially crank-shaped in plan view by a first beam, a second beam, and a connecting member. Specifically, the passenger seat side of this assembly is offset from the driver seat side thereof.

The first beam extends toward the lateral center from a right front pillar. The second beam extends toward the lateral center from a left front pillar, and a distal-end part thereof on the center side is offset in the front-rear direction of the vehicle body in relation to a distal-end part of the first beam on the center side thereof. The connecting member connects the mutually offset distal-end parts of the first and second beams.

This assembly increases the degree of freedom of the positioning of the steering column, and of the arrangement of various accessories attached to an instrument panel, such as an audio device, a navigation device, and an air conditioner duct. The space inside a passenger compartment can therefore be efficiently utilized.

A steering hanger assembly generally serves to transmit an impulsive load (side collision load) that occurs during a collision with an obstacle from a side of the vehicle, i.e., a so-called lateral collision, to the opposite side from the collision side. In the assembly disclosed in Patent Literature 1, care must be taken to efficiently transmit a side collision load between the mutually offset first beam and second beam. Since stress is concentrated in the connected portion of the mutually offset distal-end parts of the first and second beams, there is a need to increase the strength and rigidity of the connected portion. However, since simply increasing strength and rigidity leads to increased weight of the vehicle body, there is room for improvement.

The vehicular steering hanger assembly disclosed in Patent Literature 2 employs steering hanger beams configured such that distal-end parts of a pair of beams comprising straight pipes having mutually different thicknesses are fit together. The steering hanger beams are provided between left and right front pillars. A thick beam is positioned on the driver-seat side, and a thin beam is positioned on the passenger-seat side. The strength and rigidity of the steering hanger beams therefore differ between the driver-seat side and the passenger-seat side.

However, in the assembly disclosed in Patent Literature 2, there is room for improvement with regard to increasing the degree of freedom in the arrangement of various accessories.

PRIOR ART LITERATURE

Patent Literature

Patent Literature 1: Japanese Utility Model Application Laid-Open Publication No. S59-109576 A Patent Literature 2: Japanese Patent Application Laid-Open Publication No. H09-277961 A

SUMMARY OF INVENTION

Technical Problem

An object of the present invention is to provide a technique capable of increasing the strength and rigidity of a steering hanger assembly and efficiently transmitting the impulse energy of a side collision between a first beam and a second beam while increasing the degree of freedom of arrangement in an instrument panel and suppressing an increase in weight of the vehicle body.

Solution to Problem

According to a first aspect of the present invention, there is provided a vehicular steering hanger assembly for supporting a steering column, which steering hanger assembly comprises: a first beam extending toward a lateral center from a right front pillar; a second beam extending toward the lateral center from a left front pillar, a distal-end part of the second beam on the center side thereof overlapping with a distal-end part of the first beam on the center side thereof with or without a gap therebetween in a front-rear direction and/or a top-bottom direction of a vehicle body; and left and right beam connecting members for connecting the mutually overlapping distal-end parts of the first and second beams; a beam structure being configured from the first and second beams and the left and right beam connecting members; and the beam structure being also connected by a vehicle body connecting member to a vehicle body constituent member of the vehicle body other than the left and right front pillars.

Preferably, according to a second aspect of the present invention, the other vehicle body constituent member is a dashboard positioned in front of the beam structure.

More preferably, according to a third aspect of the present invention, at least one beam connecting member of the left and right beam connecting members comprises a steering support bracket for supporting the steering column, the vehicle body connecting member being a member of the beam structure, and adapted for connecting the steering support bracket to the dashboard, the vehicle body connecting member comprising a member separate from the steering support bracket.

More preferably, according to a fourth aspect of the present invention, the steering support bracket has a first joint joined to the distal-end part of the first beam, and a second joint joined to the distal-end part of the second beam.

More preferably, according to a fifth aspect of the present invention, the steering support bracket is formed having a substantially U-shaped cross-section, and an open end of the substantially U-shaped cross-section is closed by a cover.

More preferably, according to a sixth aspect of the present invention, sides constituting the substantially U-shaped cross-section of the steering support bracket are joined to either the first beam or the second beam, and the cover is joined to the distal-end part of the first beam and/or the distal-end part of the second beam.

More preferably, according to a seventh aspect of the present invention, the vehicle body connecting member is a press-molded plate, and a notch is formed therein at a location partway in the front-rear direction of the vehicle body.

More preferably, according to an eighth aspect of the present invention, the other vehicle body constituent member is a floor panel positioned below the beam structure, the vehicle body connecting member is a member extending to the floor panel from any one beam connecting member including the right beam connecting member and the left beam connecting member, the one beam connecting member has a flange, and the flange extends from the one beam connecting member so as to follow an external peripheral surface of any one beam of the first and second beams, and is joined to the external peripheral surface.

More preferably, according to a ninth aspect of the present invention, the one beam connecting member has a facing surface part facing an end surface of the one beam on a lateral center side thereof, and the flange extends so as to follow the external peripheral surface of the one beam from the facing surface part in the one beam connecting member.

More preferably, according to a tenth aspect of the present invention, the flange includes a front surface joint joined to a front surface in the external peripheral surface of the one beam, and a rear surface joint joined to a rear surface in the external peripheral surface, the vehicle body connecting member is a member having a substantially U-shaped cross-section in plan view and comprises a side wall extending downward from a bottom end of the facing surface part, a front wall extending downward from a bottom end of the front surface joint, and a rear wall extending downward from a bottom end of the rear surface joint, the one beam connecting member has a bottom joint protruding from the facing surface part toward a bottom part of an end surface of the one beam on the lateral center side thereof, and the bottom joint being joined to the bottom part of the end surface.

More preferably, according to an eleventh aspect of the present invention, the one beam connecting member has, besides the flange, a separate flange joined to the other of any of the first and second beams, and the separate flange is a portion extending from an edge of the facing surface part so as to follow the external peripheral surface of the other beam, and is joined to the external peripheral surface.

More preferably, according to a twelfth aspect of the present invention, the flange has: a through-hole formed in a facing surface part of the one beam connecting member facing the lateral direction, the one beam being able to pass through the through-hole; and an annular extension flange extending from an edge of the through-hole so as to follow the external peripheral surface of the one beam.

More preferably, according to a thirteenth aspect of the present invention, the one beam connecting member has, besides the flange, a separate flange joined to the other of any of the first and second beams, the separate flange is a portion extending from an edge of the facing surface part along the external peripheral surface of the other beam toward the front pillar on the side on which the other beam is joined, and is joined to the external peripheral surface, and the extension flange extends toward the front pillar on the side on which the one beam is joined.

More preferably, according to a fourteenth aspect of the present invention, the one beam connecting member has an inclined flange extending in the extension direction of the separate flange from the facing surface part, the inclined flange is formed so as to follow an edge of the facing surface part from the separate flange at least through region where the extension flange is formed, and the extension length of the inclined flange is set so as to gradually decrease from the separate flange to the region.

More preferably, according to a fifteenth aspect of the present invention, the through-hole and the extension flange are a hole and an annular flange formed by burring the facing surface part.

Preferably, according to a sixteenth aspect of the present invention, at least one of the first and second beams comprises a pipe, the pipe comprises a beam body and a diameter expansion part at an end part of the beam body on the lateral center side thereof, and the diameter of the diameter expansion part is greater than the diameter of the beam body.

More preferably, according to a seventeenth aspect of the present invention, the diameter expansion part is joined directly to an external peripheral surface of the other of any of the first and second beams, whereby one beam connecting member of any of the left and right beam connecting members is configured from the diameter expansion part.

More preferably, according to an eighteenth aspect of the present invention, the diameter expansion part includes a tapered part, the diameter of which increases toward the diameter expansion part from the beam body.

More preferably, according to a nineteenth aspect of the present invention, the one beam connecting member of any of the left and right beam connecting members has a first flange superposed on and joined to an external peripheral surface of the diameter expansion part of the one beam, and a second flange superposed on and joined to the external peripheral surface of the other beam.

More preferably, according to a twentieth aspect of the present invention, the diameter expansion part includes a large-diameter part adjoining an end of the tapered part on a large-diameter side thereof, the diameter of the large-diameter part set to be the same as the diameter of the end of the tapered part on the large-diameter side thereof, and the first flange is joined to the large-diameter part.

More preferably, according to a twenty-first aspect of the present invention, the diameter expansion part has a trapezoid part, where the boundary between the beam body and the tapered part is a top side thereof, the boundary between the tapered part and the large-diameter part is a bottom side thereof, and outside lines of the tapered part are a set of opposing sides thereof.

More preferably, according to a twenty-second aspect of the present invention, the other vehicle body constituent member is a floor panel positioned below the beam structure, and the vehicle body connecting member is a member extending from the one beam connecting member to the floor panel.

According to a twenty-third aspect of the present invention, there is provided a vehicular steering hanger assembly for supporting a steering column, which assembly comprises: a first beam extending toward a lateral center from a right front pillar; a second beam extending toward the lateral center from a left front pillar, a distal-end part of the second beam on the center side thereof overlapping with a distal-end part of the first beam on the center side thereof with or without a gap therebetween; left and right beam connecting members for connecting the mutually overlapping distal-end parts of the first and second beams and a floor connecting frame extending downward from any one beam connecting member of the right beam connecting member and the left beam connecting member, and being joined to the floor panel; the one beam connecting member having a first flange joined to an external peripheral surface of one beam of any of the first and second beams and extending from the one beam connecting member so as to follow the external peripheral surface, and a second flange joined to an external peripheral surface of the other of any of the first and second beams and extending from the one beam connecting member so as to follow the external peripheral surface; and a beam structure being configured from the first and second beams and the left and right beam connecting members.

According to a twenty-fourth aspect of the present invention, there is provided a vehicular steering hanger assembly for supporting a steering column, which assembly comprises: a first beam extending toward a lateral center from a right front pillar; and a second beam extending toward the lateral center from a left front pillar, a distal-end part of the second beam on the center side thereof overlapping with a distal-end part of the first beam on the center side thereof; at least one of the first and second beams comprising a pipe; the pipe comprising a beam body and a diameter expansion part of the beam body; the diameter of the diameter expansion part being greater than the diameter of the beam body; and the diameter expansion part being joined directly to an external peripheral surface of the other of any of the first and second beams.

Advantageous Effects of Invention

In the first aspect of the present invention, the distal-end part of the second beam extending toward the lateral center from the left front pillar overlaps with the distal-end part of the first beam extending toward the lateral center from the right front pillar. Specifically, the second beam is offset with respect to the first beam in the front-rear direction and/or the top-bottom direction of the vehicle body. The first and second beams can therefore be easily arranged in the passenger compartment in accordance with an instrument panel.

Furthermore, the distal-end parts of the first and second beams are connected by the left and right beam connecting members. The first and second beams and the left and right beam connecting members constitute a beam structure. The beam structure is configured as generally frame-shaped on a lateral center side. The strength and rigidity of the joined portions of the distal-end parts of the first and second beams can therefore be increased.

The efficiency of load transmission between the first beam and the second beam can also be increased. In particular, since the impulse energy of a collision with an obstacle from a side of the vehicle, i.e., a so-called lateral collision, can be efficiently transmitted between the first beam and the second beam, the impulse energy can be adequately transmitted to the front pillar on the opposite side from that of the lateral collision.

Furthermore, the beam structure is also connected by the vehicle body connecting member to a portion (other vehicle body constituent member) of the vehicle body other than the left and right front pillars. Since the beam structure is supported by the vehicle body connecting member, a commensurate amount of additional strength and rigidity can be provided. There is no need for further reinforcement for increasing the strength and rigidity of the beam structure. Since the weight of the beam structure can be suppressed, an increase in the weight of the vehicle body can also be suppressed.

In the invention according to the first aspect, offsetting the second beam with respect to the first beam between the driver-seat side and the passenger-seat side makes it possible to increase the degree of freedom of arrangement in an instrument panel. The strength and rigidity of the steering hanger assembly can also be increased, and an increase in the weight of the vehicle body can be suppressed.

In the invention according to the second aspect, the other vehicle body constituent member to which the beam structure is connected through use of the vehicle body connecting member is a dashboard. A load acting on the beam structure is transmitted to the dashboard via the vehicle body connecting member. Since the beam structure is supported by the dashboard, the strength and rigidity of the beam structure can be even further increased while an increase in the weight of the vehicle body is suppressed.

In the invention according to the third aspect, at least one of the left and right beam connecting members is configured from a steering support bracket for supporting the steering column. Specifically, the steering support bracket is a portion of the beam structure, and is connected to the dashboard by the vehicle body connecting member. The vehicle body connecting member is a member separate from the steering support bracket. The strength characteristics of the steering support bracket and the strength characteristics of the vehicle body connecting member can therefore easily be set individually.

For example, the characteristics of the steering support bracket are set so that the strength or rigidity necessary for supporting the steering column is obtained. Meanwhile, the characteristics of the vehicle body connection member are set so as to increase the ability to absorb impulse energy when a collision occurs with an obstacle from in front of the vehicle, i.e., when a so-called frontal collision occurs. Specifically, the wall thickness of the steering support bracket can be set to a large value, and the wall thickness of the vehicle body connecting member can be set to a small value.

In the invention according to the fourth aspect, the steering support bracket has a first joint joined to the distal-end part of the first beam, and a second joint joined to the distal-end part of the second beam. There is therefore no need for a separate member for joining the steering support bracket to the first and second beams. The beam structure can therefore be configured from a small number of components.

In the invention according to the fifth aspect, the open end of the steering support bracket having a substantially U-shaped cross-section is closed by the cover, and a closed section is thereby formed. The rigidity of the steering support bracket can therefore be increased.

In the invention according to the sixth aspect, sides constituting the substantially U-shaped cross-section of the steering support bracket are joined to either the first beam or the second beam. The cover for closing the open end of the substantially U-shaped cross-section is joined to the distal-end part of the first beam and/or the distal-end part of the second beam. The strength with which the steering support bracket is joined to the first and second beams is therefore increased.

In the invention according to the seventh aspect, the vehicle body connecting member is a press-molded plate, and a notch is formed therein at a location partway in the front-rear direction of the vehicle body. The weak portion where the notch is formed in the vehicle body connecting member therefore undergoes plastic deformation when a collision occurs with an obstacle from in front of the vehicle, i.e., when a so-called frontal collision occurs. For example, the vehicle body connecting member bends at the notch, which acts as a starting point for bending, and the absorption of impulse energy can thereby be facilitated.

In the invention according to the eighth aspect, the other vehicle body constituent member to which the beam structure is connected by the vehicle body connecting member is a floor panel. The vehicle body connecting member extends to the floor panel from one beam connecting member. A load acting on the beam structure is transmitted from the one beam connecting to the floor panel via the vehicle body connecting member. Since the beam structure is supported by the floor panel, the strength and rigidity of the beam structure can be even further increased while an increase in the weight of the vehicle body is suppressed.

Furthermore, one beam connecting member of the left and right beam connecting members has a flange. The flange extends from the one beam connecting member so as to follow an external peripheral surface of any one beam of the first and second beams, and is joined to the external peripheral surface. The strength with which the one beam and the one beam connecting member are joined is therefore increased. Consequently, the strength with which the vehicle body connecting member is joined to the beam structure via the one beam connecting member is increased. The strength and rigidity of the beam structure can therefore be even further increased.

In the invention according to the ninth aspect, the one beam connecting member of any of the left and right beam connecting members has a facing surface part facing an end surface of the one beam on a lateral center side thereof. The flange extends so as to follow the external peripheral surface of the one beam from the facing surface part in the one beam connecting member. The flange can therefore be joined to the external peripheral surface of the end surface portion of the one beam on the lateral center side thereof while the end surface portion is covered by the facing surface part and the flange. The strength with which the one beam and the one beam connecting member are joined is further increased. Consequently, the strength with which the vehicle body connecting member is joined to the beam structure via the one beam connecting member is increased. The strength and rigidity of the beam structure can therefore be even further increased.

In the invention according to the tenth aspect, a front surface joint of the flange is joined to a front surface in the external peripheral surface of the one beam. A rear surface joint of the flange is joined to a rear surface in the external peripheral surface of the one beam. The vehicle body connecting member is a member having a substantially U-shaped cross-section in plan view and comprises a side wall, a front wall, and a rear wall. The side wall extends downward from a bottom end of the facing surface part. The front wall extends downward from a bottom end of the front surface joint. The rear wall extends downward from a bottom end of the rear surface joint.

The one beam connecting member is thus formed having a substantially U-shaped cross-section in plan view by the facing surface part, the front surface joint, and the rear surface joint. The vehicle body connecting member is formed having a substantially U-shaped cross-section in plan view from the facing surface part, the front surface joint, and the rear surface joint of the one beam connecting member, which each extend continuously downward. Specifically, the cross-section of the vehicle body connecting member is essentially continuous with respect to the cross-section of the one beam connecting member. The strength and rigidity of the one beam connecting member and the strength and rigidity of the vehicle body connecting member can therefore be made essentially uniform. A load acting on the beam structure can be efficiently transmitted and dispersed from the one beam connecting member to the floor panel via the vehicle body connecting member.

Furthermore, the bottom joint of the one beam connecting member protrudes from the facing surface part toward a bottom part of an end surface of the one beam on the lateral center side thereof, and the bottom joint is joined to the bottom part of the end surface. The bottom joint can therefore be fixed to the bottom part of the end surface even when a gap is present between the facing surface part and the bottom part of the end surface of the one beam on the lateral center thereof. The one beam connecting member is joined to the one beam at three locations including the front part, the rear part, and the bottom part of the one beam connecting member, and the strength with which the one beam connecting member is joined to the beam structure is thereby increased. A load acting on the beam structure can therefore be efficiently transmitted to the one beam connecting member.

In the invention according to the eleventh aspect, the one beam connecting member has, besides the flange, a separate flange for joining to the other of any of the first and second beams. The separate flange extends from an edge of the facing surface part so as to follow the external peripheral surface of the other beam, and is joined to the external peripheral surface. The one beam connecting member is thus securely joined to both the first and second beams by two flanges. As a result, the strength with which the one beam connecting member is joined to the first and second beams is increased. Loads can therefore be efficiently transmitted between the first beam and the second beam by the one beam connecting member. Since there is also no need for a separate member for joining the one beam connecting member to the first and second beams, the number of components can remain small, and a reduction in the cost of the steering hanger assembly can be anticipated.

In the invention according to the twelfth aspect, the flange has a though-hole formed in a facing surface part of the one beam connecting member facing the lateral direction, the one beam being able to pass through the through-hole, and an annular extension flange extending from an edge of the through-hole so as to follow the external peripheral surface of the one beam. A tolerance is present at the position of the end surface, on the lateral center side, of the one beam attached to the front pillar. However, the passing of the end part of the one beam on the lateral center side thereof through the through-hole and the annular extension flange makes it possible to easily absorb the tolerance at the position of the end surface of the one beam. Since the extension flange is formed having an annular shape, the extension flange can be joined over the entire circumference thereof or at any location thereof to the external peripheral surface of the one beam passed through the inside of the extension flange. There is therefore no need to provide a protruding part protruding from the facing surface part toward the end surface of the one beam in order to join the facing surface part to a predetermined location on the end surface of the one beam.

In the invention according to the thirteenth aspect, the one beam connecting member has, besides the flange, a separate flange for joining to the other of any of the first and second beams. The separate flange is a portion extending from an edge of the facing surface part along the external peripheral surface of the other beam toward the front pillar on the side on which the other beam is joined, and is joined to the external peripheral surface. The extension flange extends toward the front pillar on the side on which the one beam is joined. The one beam connecting member is thus securely joined to both the first and second beams by two flanges. As a result, the strength with which the one beam connecting member is joined to the first and second beams is increased. Loads can therefore be efficiently transmitted between the first beam and the second beam by the one beam connecting member. Since there is also no need for a separate member for joining the one beam connecting member to the first and second beams, the number of components can remain small, and a reduction in the cost of the steering hanger assembly can be anticipated.

Furthermore, the extension flange extends in the direction opposite the direction in which the separate flange extends. Therefore, since the amount of offset of the second beam with respect to the first beam is set to a small value, both flanges can easily be provided to the one beam connecting member even when the separate flange is close to the extension flange. The degree of freedom of arrangement if the first and second beams can also be increased.

In the invention according to the fourteenth aspect, an inclined flange is formed in the one beam connecting member. The inclined flange is formed so as to follow an edge of the facing surface part from the separate flange at least through a region where the extension flange is formed. Loads can therefore be efficiently transmitted between the first beam and the second beam by the inclined flange.

In the invention according to the fifteenth aspect, the through-hole and the extension flange are a hole and an annular flange formed by burring the facing surface part. The through-hole and the extension flange can therefore be easily formed in the facing surface part.

In the invention according to the sixteenth aspect, at least one of the first and second beams comprises a beam body and a diameter expansion part at an end part of the beam body on the lateral center side thereof. The diameter of the diameter expansion part is greater than the diameter of the beam body. The interval between the external peripheral surface of the diameter expansion part of the one beam and the external peripheral surface of the other beam is therefore decreased by an amount proportional to having the large-diameter diameter expansion part, even when the amount of offset of the second beam with respect to the first beam is constant. Consequently, the efficiency of load transmission between the first beam and the second beam can be increased. In particular, since the impulse energy of a collision with an obstacle from a side of the vehicle, i.e., a so-called lateral collision, can be efficiently transmitted between the first beam and the second beam, the impulse energy can be adequately transmitted to the front pillar on the opposite side from that of the lateral collision. The overall strength and rigidity of the beam structure can also be increased.

Furthermore, since the interval between the external peripheral surface of the large-diameter part of the one beam and the external peripheral surface of the other beam can be set to a small value, the overall strength and rigidity of the beam structure can be ensured even when the diameter of the beam body of at least one beam is small. Therefore, by reducing the diameter of the beam body of at least one beam, the degree of freedom of arrangement of the beam structure with respect to the vehicle body is increased, and a reduction in weight of the steering hanger assembly can be anticipated.

In the invention according to the seventeenth aspect, the diameter expansion part is joined directly to an external peripheral surface of the other of any of the first and second beams. As a result, the diameter expansion part can perform the role of one beam connecting member of any of the left and right beam connecting members. Since the diameter expansion part is directly joined to the external peripheral surface of the other beam, the strength with which the first beam and the second beam are joined is increased. Consequently, the overall strength and rigidity of the beam structure can be further increased.

In the invention according to the eighteenth aspect, the diameter expansion part includes a tapered part, the diameter of which increases toward the diameter expansion part from the beam body. The efficiency of load transmission from the beam body to the diameter expansion part can therefore be increased, and the overall strength and rigidity of the beam structure can be increased.

In the invention according to the nineteenth aspect, the one beam connecting member of any of the left and right beam connecting members has a first flange superposed on and joined to an external peripheral surface of the diameter expansion part, and a second flange superposed on and joined to the external peripheral surface of the other beam. Since the one beam connecting member can therefore be adequately joined to the diameter expansion part and the other beam by the first and second flanges, the joining strength is increased. As a result, the overall strength and rigidity of the beam structure can be increased. The degree of freedom in setting the amount of offset of the second beam with respect to the first beam, or in the shape of the first and second beams, can also be increased relative to a case in which the diameter expansion part is joined directly to the other beam.

In the invention according to the twentieth aspect, the diameter expansion part includes a large-diameter part adjoining an end of the tapered part large-diameter side thereof. The diameter of the large-diameter part is set to be the same as the diameter of the end of the tapered part on the large-diameter side thereof. The first flange is joined to the large-diameter part. The first flange can therefore be joined to the one beam stably and without inclination relative to a case in which the first flange is joined to a small-diameter portion. Furthermore, the small-diameter beam body does not interfere with the first flange when the first flange is superposed on the external peripheral surface of the large-diameter diameter expansion part. The first flange can therefore be easily positioned relative to the one beam.

In the invention according to the twenty-first aspect, the diameter expansion part has a trapezoid part, where the boundary between the beam body and the tapered part is a top side thereof, the boundary between the tapered part and the large-diameter part is a bottom side thereof, and outside lines of the tapered part are a set of opposing sides thereof. Since the impulse energy of a collision with an obstacle from a side of the vehicle, i.e., a so-called lateral collision, can therefore be efficiently transmitted between the first beam and the second beam, the impulse energy can be adequately transmitted to the front pillar on the opposite side from that of the lateral collision. The overall strength and rigidity of the beam structure can also be increased.

In the invention according to the twenty-second aspect, the other vehicle body constituent member to which the beam structure is connected by the vehicle body connecting member is a floor panel. The vehicle body connecting member extends from the one beam connecting member to the floor panel. A load acting on the beam structure is transmitted from the one beam connecting member to the floor panel via the vehicle body connecting member. Since the beam structure is supported by the floor panel, the strength and rigidity of the beam structure can be even further increased while an increase in the weight of the vehicle body is suppressed.

In the invention according to the twenty-third aspect, a distal-end part of a second beam extending toward the lateral center from a left front pillar overlaps with a distal-end part of a first beam extending toward a lateral center from a right front pillar. Specifically, the second beam is offset with respect to the first beam in the front-rear direction and/or the top-bottom direction of the vehicle body. The first and second beams can therefore be easily arranged in the passenger compartment in accordance with an instrument panel.

Furthermore, the distal-end parts of the first and second beams are connected by the left and right beam connecting members. The first and second beams and the left and right beam connecting members constitute a beam structure. The beam structure is configured as generally frame-shaped on a lateral center side. The strength and rigidity of the joined portions of the distal-end parts of the first and second beams can therefore be increased.

The efficiency of load transmission between the first beam and the second beam can also be increased. In particular, since the impulse energy of a collision with an obstacle from a side of the vehicle, i.e., a so-called lateral collision, can be efficiently transmitted between the first beam and the second beam, the impulse energy can be adequately transmitted to the front pillar on the opposite side from that of the lateral collision.

Furthermore, the one beam connecting member of any of the left and right beam connecting members has a first flange superposed on and joined to an external peripheral surface of one beam, and a second flange superposed on and joined to the external peripheral surface of the other beams. Since the one beans connecting member can therefore be adequately joined to the one beam and the other beam by the first and second flanges, the joining strength is increased. As a result, the overall strength and rigidity of the beam structure can be even further increased. Loads can also be more efficiently transmitted mutually between the first flange and second flange of the one beam connecting member.

Furthermore, the beam structure is connected by the vehicle body connecting member to a floor panel in addition to the left and right front pillars. Since the beam structure is supported by the vehicle body connecting member a commensurate amount of additional strength and rigidity can be provided. There is no need for further reinforcement for increasing the strength and rigidity of the beam structure. Since the weight of the beam structure can be suppressed, an increase in the weight of the vehicle body can also be suppressed.

In the invention according to the twenty-third aspect, offsetting the second beam with respect to the first beams between the driver-seat side and the passenger-seat side in this manner makes it possible to cease the degree of freedom of arrangement in an instrument panel. The strength and rigidity of the steering hanger assembly can also be increased, and an increase in the weight of the vehicle body can be suppressed.

In the invention according to the twenty-fourth aspect, a distal-end part of a second beam extending toward the lateral center from a left front pillar overlaps with a distal-end part of a first beam extending toward a lateral center from a right front pillar. Specifically, the second beam is offset with respect to the first beam in the front-rear direction and/or the top-bottom direction of the vehicle body. The first and second beams can therefore be easily arranged in the passenger compartment in accordance with an instrument panel.

Furthermore, in the invention according to the twenty-fourth aspect, at least one of the first and second beams comprises a beam body and a diameter expansion part of the beam body. The diameter of the diameter expansion part greater than the diameter of the beam body. The interval between the external peripheral surface of the diameter expansion part of the one beam and the external peripheral surface of the other beam is therefore decreased by an amount proportional to having the large-diameter diameter expansion part, even when the amount of offset of the second beam with respect to the first beam is constant. Consequently, the efficiency of load transmission between the first beam and the second beam can be increased. In particular, since the impulse energy of a collision with an obstacle from a side of the vehicle, i.e., a so-called lateral collision, can be efficiently transmitted between the first beam and the second beam, the impulse energy can be adequately transmitted to the front pillar on the opposite side from that of the lateral collision.

Furthermore, since the interval between the external peripheral surface of the large-diameter part of the one beam and the external peripheral surface of the other beam can be set to a small value, the overall strength and rigidity of the beam structure can be ensured even when the diameter of the beam body of at least one beam is small. Therefore, by reducing the diameter of the beam body of at least one beam, the degree of freedom of arrangement of the beam structure with respect to the vehicle body can be increased.

Furthermore, the diameter expansion part is joined directly to an external peripheral surface of the other of any of the first and second beams. Specifically, the distal-end parts of the first and second beams are directly joined. The strength and rigidity of the joined portions of the distal-end parts of the first and second beams can therefore be increased.

The efficiency of load transmission between the first beam and the second beam can also be increased. In particular, since the impulse energy of a collision with an obstacle from a side of the vehicle, i.e., a so-called lateral collision, can be efficiently transmitted between the first beam and the second beam, the impulse energy can be adequately transmitted to the front pillar on the opposite side from that of the lateral collision.

In the invention according to the twenty-fourth aspect, offsetting the second beam with respect to the first beam between the driver-seat side and the passenger-seat side in this manner makes it possible to increase the degree of freedom of arrangement in an instrument panel. The strength and rigidity of the steering hanger assembly can also be increased, and an increase in the weight of the vehicle body can be suppressed.

BRIEF DESCRIPTION OF DRAWINGS

FIG. 11 is a perspective view showing a second flange and a floor connecting frame shown in FIG. 10;

FIG. 12 is a sectional view taken along 12-12 of FIG. 10;

DESCRIPTION OF EMBODIMENTS

Certain preferred embodiments of the present invention are described below with reference to the accompanying drawings.

First Embodiment

The vehicular steering hanger assembly according to a first embodiment will be described with reference to FIGS. 1 through 9.

Figure 1:
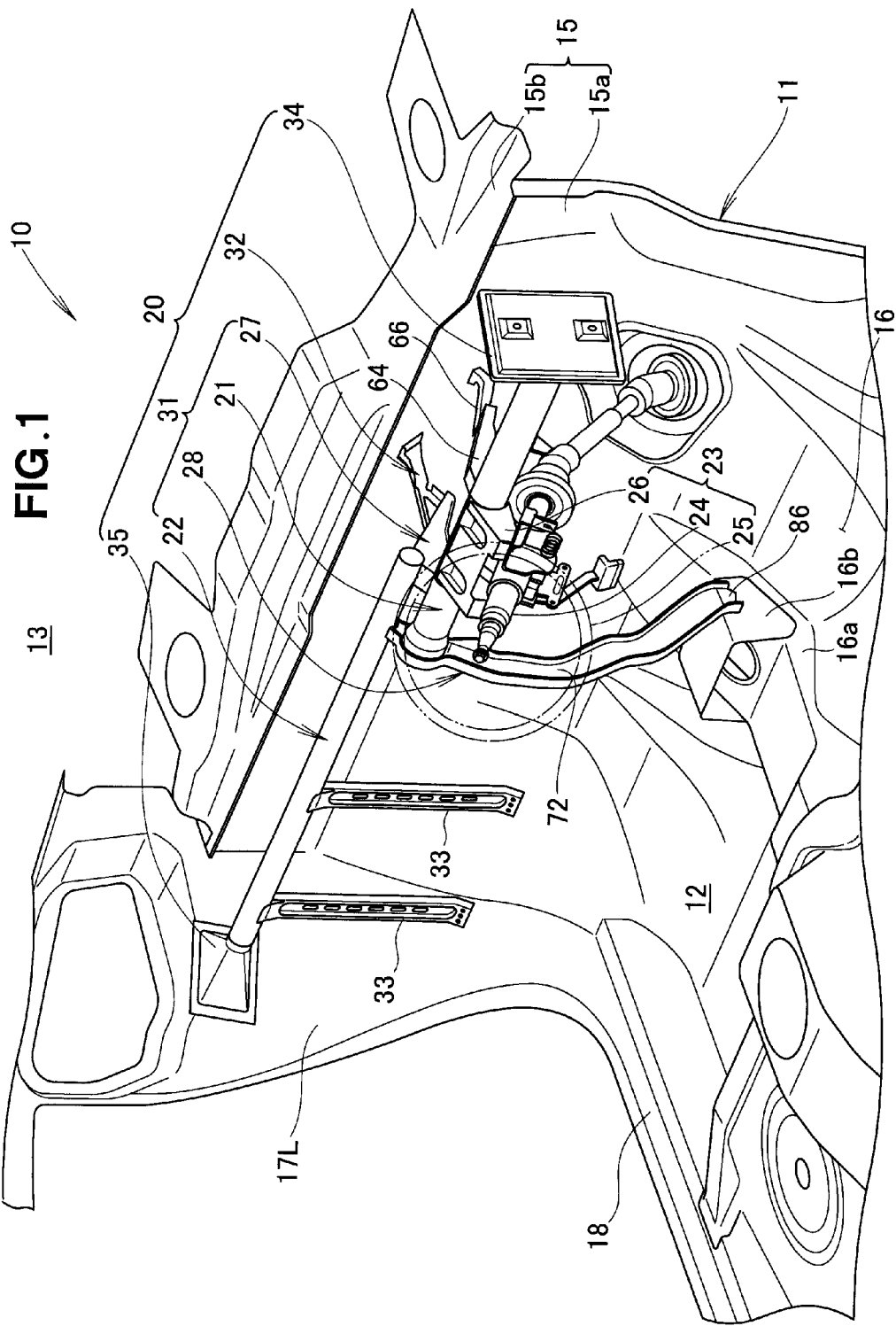
FIG. 1 is a perspective view showing a passenger compartment of a vehicle in which is mounted a vehicular steering hanger assembly according to a first embodiment of the present invention.
Figure 2:
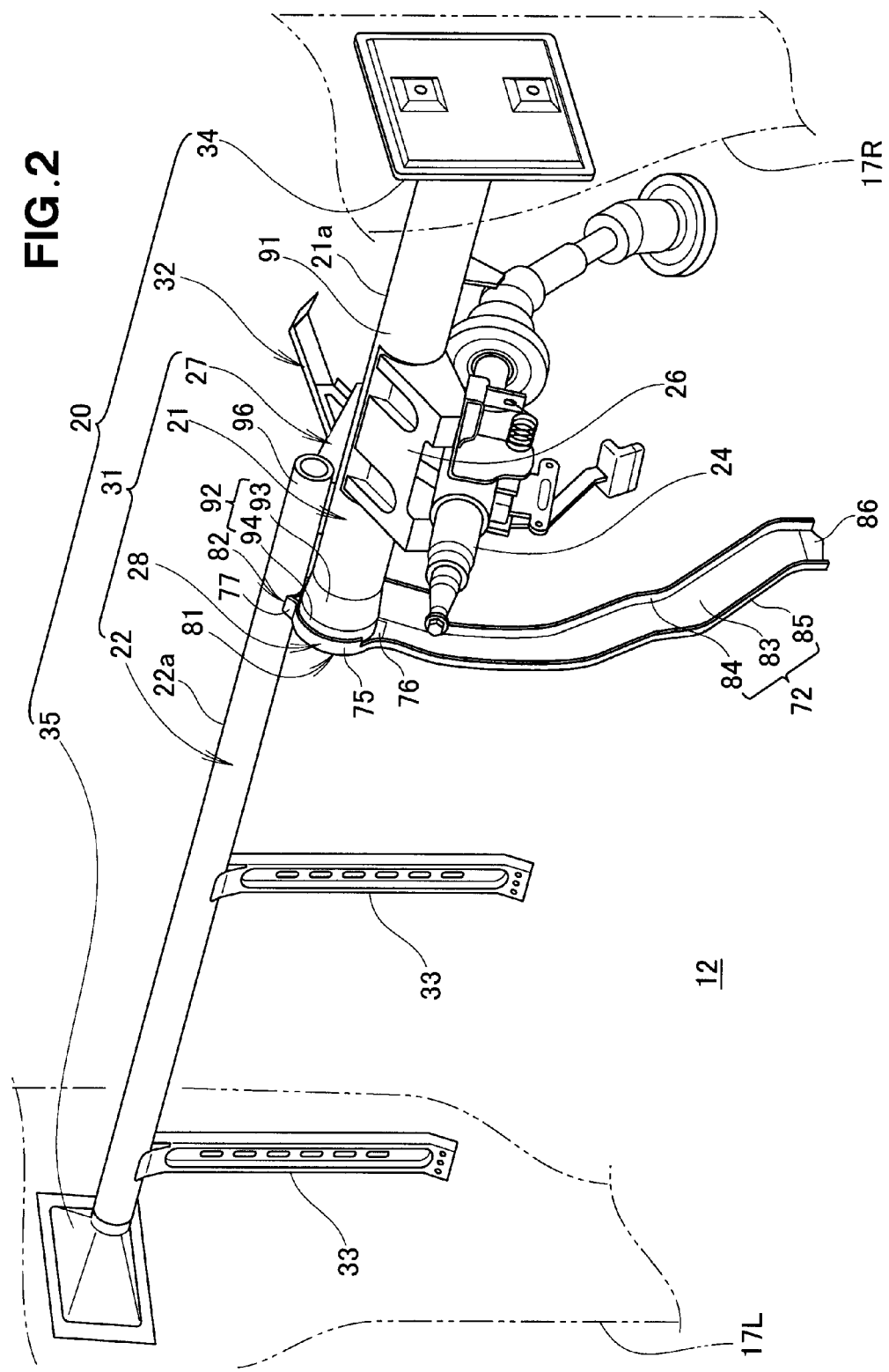
FIG. 2 is a perspective view showing the vehicular steering hanger assembly of FIG. 1.

As shown in FIG. 1, a vehicle 10 is a passenger car, for example, and a front engine compartment 13 and a passenger compartment 12 positioned directly behind the engine compartment 13 are formed in an inside of a vehicle body 11. The vehicle body 11 is configured from a monocoque body, and is formed essentially left-right symmetrically. As shown in FIGS. 1 and 2, a front part of the vehicle body 11 includes a dashboard 15, a floor panel 16, left and right front pillars 17L, 17R, and left and right side sills 18 (only the left side sill 18 being shown).

The dashboard 15 is a member for partitioning the passenger compartment 12 and the engine compartment 13, and comprises a dashboard lower panel 15a on a bottom side thereof and a dashboard top panel 15b on a top side thereof. The floor panel 16 extends toward the rear of the vehicle body from a bottom end of the dashboard 15. The left and right side sills 18 are positioned on both the left and right sides of a center part of the vehicle body 11, and extend toward the front and rear of the vehicle body 11. Laterally directed outside ends of the floor panel 16 are joined to the left and right side sills 18. The left and right front pillars 17L, 17R are erected from front end parts of the left and right side sills 18.

A steering hanger assembly 20 is provided in a position close to the dashboard 15 (to the rear of the dashboard 15) in the passenger compartment 12. The steering hanger assembly 20 is referred to by the abbreviation "hanger assembly 20" hereinafter. The hanger assembly 20 supports a steering column 26 of a steering apparatus 23.

The steering apparatus 23 includes a gear box (not shown) positioned in the engine compartment 13, a steering shaft 24 connected to a gear mechanism in the gear box, a steering wheel 25 attached to the steering shaft 24, and the steering column 26 for rotatable supporting the steering shaft 24. The steering wheel 25 and the steering column 26 are disposed on the right side, for example, of the vehicle body 11.

The hanger assembly 20 includes a first beam 21, a second beam 22, and left and right beam connecting members 27, 28 and vehicle body connecting members 32, 72. The first and second beams 21, 22 are configured from laterally directed slender straight piping (commonly referred to as "round piping") having a circular cross-section, e.g., steel tubing. Since the first and second beams 21, 22 are configured from piping having a circular cross-section, the first and second beams 21, 22 are referred to as "pipes 21, 22" as appropriate.

The first beam 21 is one beam disposed on a driver's seat side, and extends linearly toward the vehicle-width center from the right front pillar 17R. An end part of the first beam 21 on the outside in the lateral direction is attached to the right front pillar 17 by a right hanger support 34.

As shown in FIGS. 2 and 7 through 9, the first beam 21 comprises a laterally directed slender beam body 91 that extends toward the lateral center from the right front pillar 17R, and a diameter expansion part 92 on an end part 97 of the beam body 91 on the lateral center side thereof.

The diameter expansion part 92 is continuously formed on the end part 97 of the beam body 91 (general part 91), and comprises a tapered part 93 and a large-diameter part 94. The tapered part 93 (broadening part 93) is a complete round tapered ring, the diameter of which gradually increases from the end part 97 on the lateral center side of the beam body 91 toward the lateral outside, i.e., toward the left front pillar 17L. The diameter expansion part 92 thus includes the tapered part 93, the diameter of which increases toward the diameter expansion part 92 from the beam body 91. The large-diameter part 94 (flat surface part 94) is a short complete-circular ring adjoining an end 98 of the tapered part 93 on the large-diameter side thereof. The diameter of the large-diameter part 94 is set to be the same as the diameter of the end 98 of the tapered part 93 on the large-diameter side thereof. An end surface 95 (extended end surface 95) of the large-diameter part 94 corresponds to an end of the first beam 21 on the lateral center side thereof.

Figure 9:
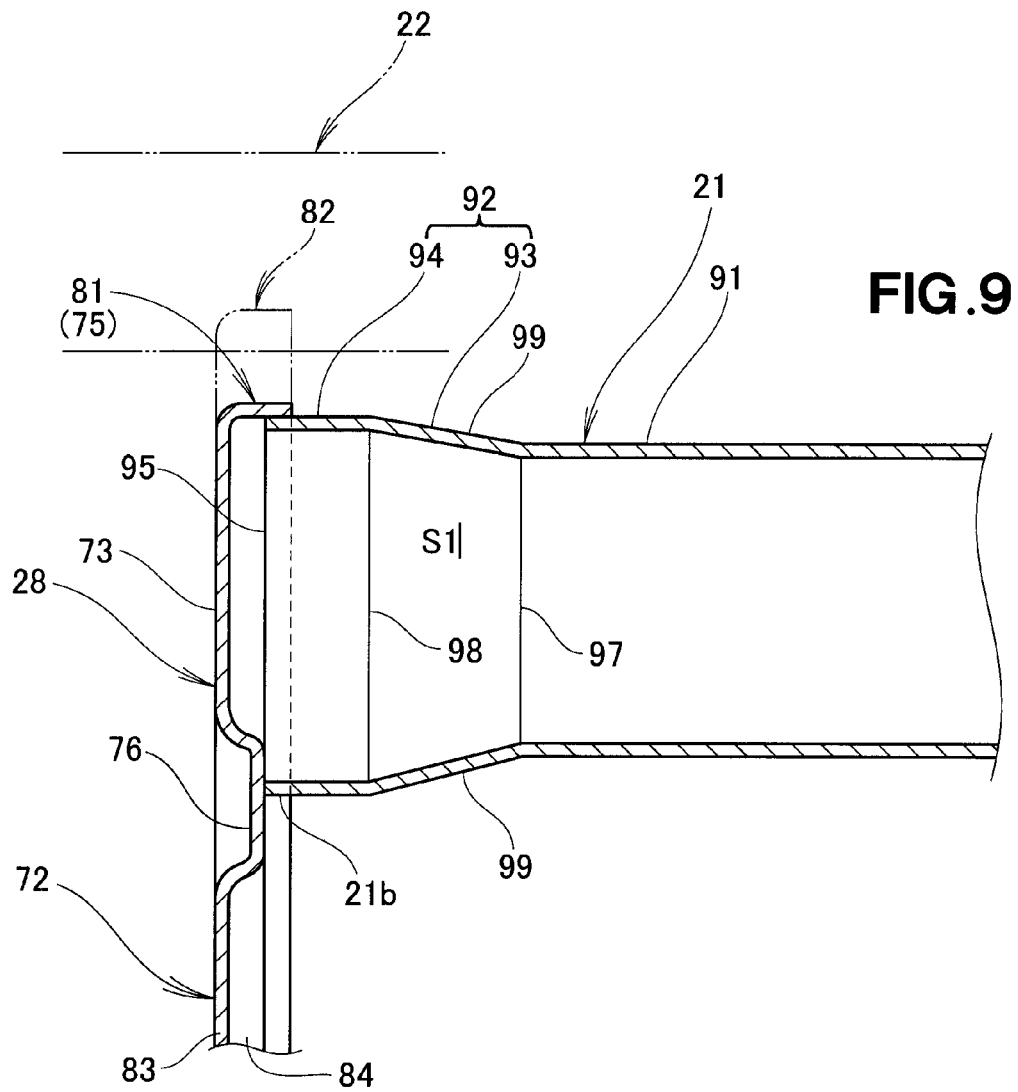
FIG. 9 is a sectional view taken along line 9-9 of FIG. 7.

As shown in FIG. 9, the outline of the tapered part 93 is trapezoidal as viewed in a cross-section of the first beam 21 along the longitudinal direction of the first beam 21. In other words, the diameter expansion part 92 has a trapezoidal space S1, i.e., a trapezoid part S1, where the boundary 97 (end part 97) between the beam body 91 and the tapered part 93 is the top side thereof, the boundary 98 between the tapered part 93 and the large-diameter part 94 is the bottom side thereof, and the outside lines 99, 99 of the tapered part 93 are a set of opposing sides thereof.

Figure 6:
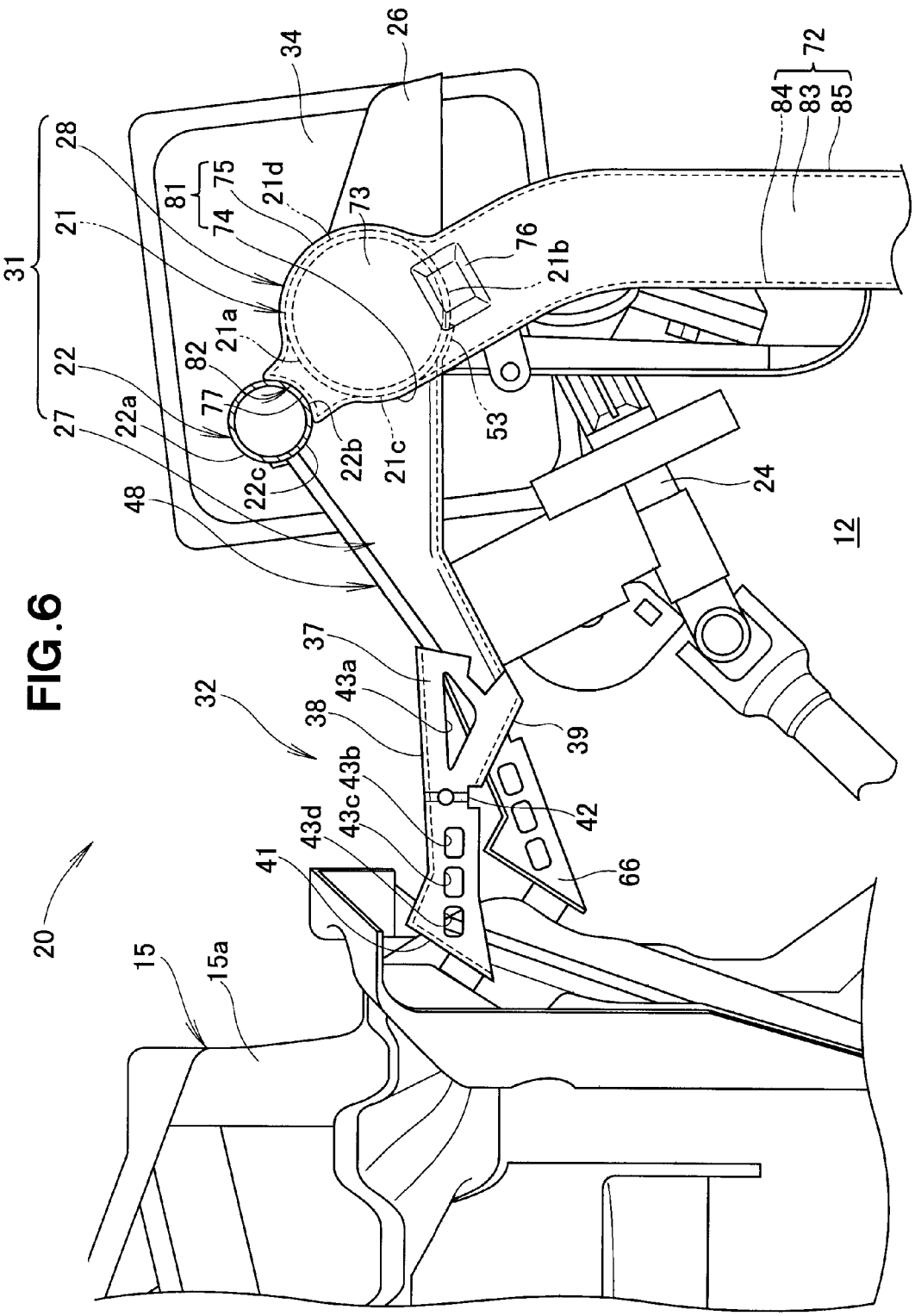
FIG. 6 is a sectional view taken along line 6-6 of FIG. 3.

As shown in FIGS. 1, 2, and 6, the second beam 22 is another beam disposed on a passenger seat side, and extends linearly toward the lateral center from the left front pillar 17L. An end part of the second beam 22 on the outside in the lateral direction is attached to the left front pillar 17L by a left hanger support 35. A distal-end part 96 of the left second beam 22 on at least the lateral center side overlaps with the distal-end part of the first beam 21 on the lateral center side with or without a gap therebetween. The direction of the overlapping is in the front-rear direction and/or the top-bottom direction of the vehicle body.

Specifically, the left-side second beams 22 is disposed parallel to and at a predetermined interval from the right-side first beam 21. The distal-end part 96 of the left second beams 22 on at least the lateral center side thereof is offset with respect to the first beam 21 in the front-rear direction and/or the top-bottom direction of the vehicle body. For example, the left second beam 22 is offset with respect to the first beams 21 in the upward and forward direction of the vehicle body.

Furthermore, as shown in FIGS. 1 and 2, top ends of a pair of substantially vertical glove box support members 33, 33 are attached to the second beam 22. Bottom ends of the pair of glove box support members 33, 33 are attached to the dashboard lower panel 15a or the left front pillar 17L. A glove box (not shown) is supported by the pair of glove box support members 33, 33.

Figure 3:
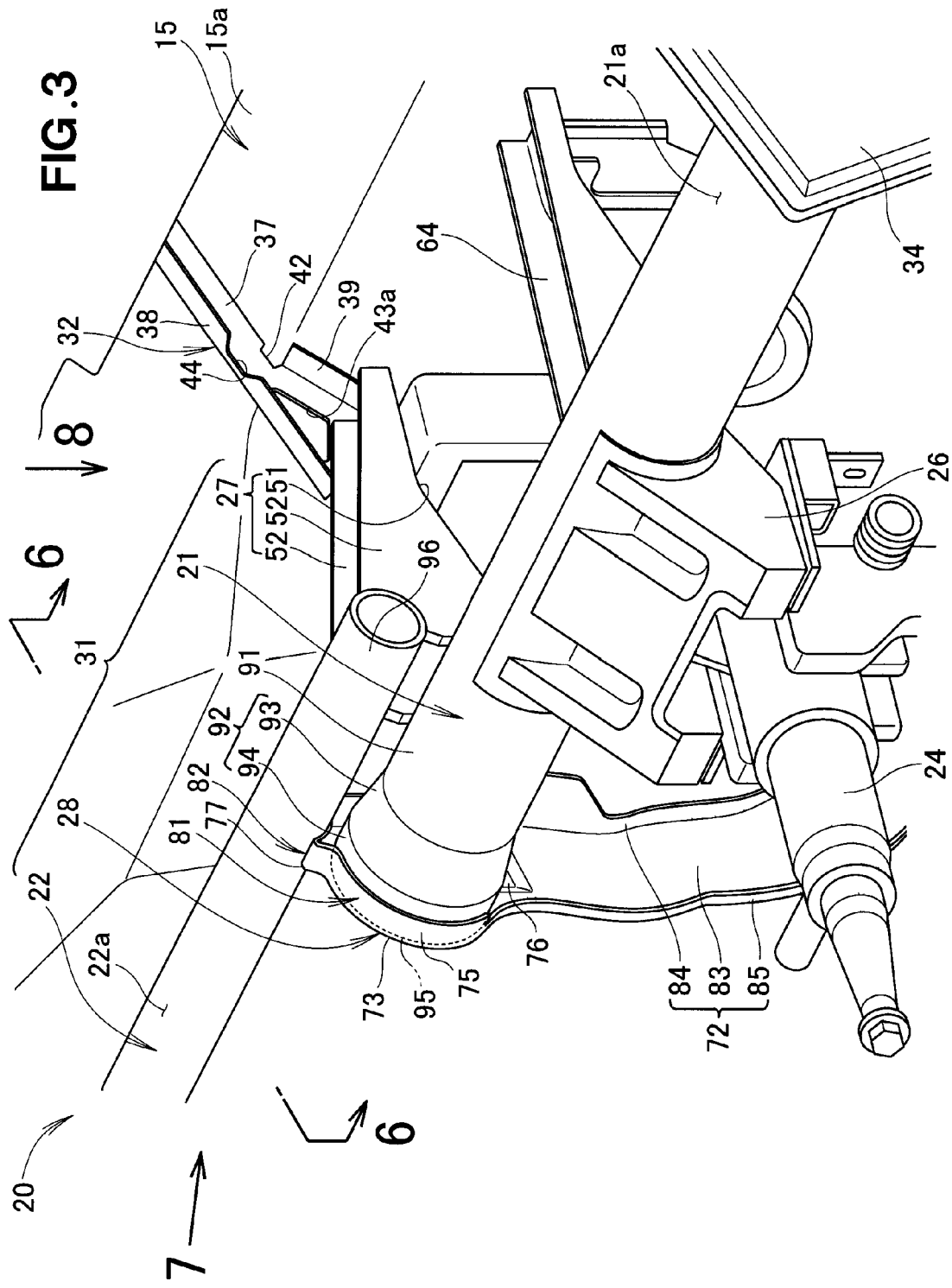
FIG. 3 is a perspective view showing a lateral center portion of the vehicular steering hanger assembly of FIG. 2.

As shown in FIGS. 1, 3, and 6, the left and right beam connecting 27, 28 are members for connecting the mutually overlapping distal-end parts of the first and second beams 21, 22. At least one of the left and right beam connecting members 27, 28, e.g., the right beam connecting member 27, is a member for supporting the steering column 26. The right beam connecting member 27 is referred to as the "steering support bracket 27" or the "first bracket 27," as appropriate. The left beam connecting member 28 is referred to as the "second bracket," as appropriate.

The laterally extending first and second beams 21, 22 and the left and right beam connecting members 27, 28 extending in the front-rear direction of the vehicle body constitute a beam structure 31. The beam structure 31 is positioned in the middle of the passenger compartment 12. In other words, the beam structure 31 is positioned higher than the floor panel 16 and close to the dashboard 15 (to the rear of the dashboard 15).

As shown in FIGS. 1 and 2, the beam structure 31 is joined by the vehicle body connecting member 32 to the dashboard 15 positioned in front of the beam structure 31, and is joined by the vehicle body connecting member 72 to the floor panel 16 positioned below the beam structure 31.

The vehicle body connecting member 32 is referred to hereinafter as the "first vehicle body connecting member 32" or the "dash connecting bracket 32," as appropriate. The vehicle body connecting member 72 is referred to hereinafter as the "second vehicle body connecting member 72," the "floor connecting frame 72," or the "stay 72," as appropriate.

Specifically, the beam structure 31 is connected to a vehicle body constituent member 15 of the vehicle body 11 other than the left and right front pillars 17L, 17R, i.e., to the dashboard 15 as well, by the substantially horizontal first vehicle body connecting member 32. The beam structure 31 is connected to a vehicle body constituent member 16 of the vehicle body 11 other than the left and right front pillars 17L, 17R, i.e., to the floor panel 16 as well, by the substantially vertical second vehicle body connecting member 72.

Figure 7:
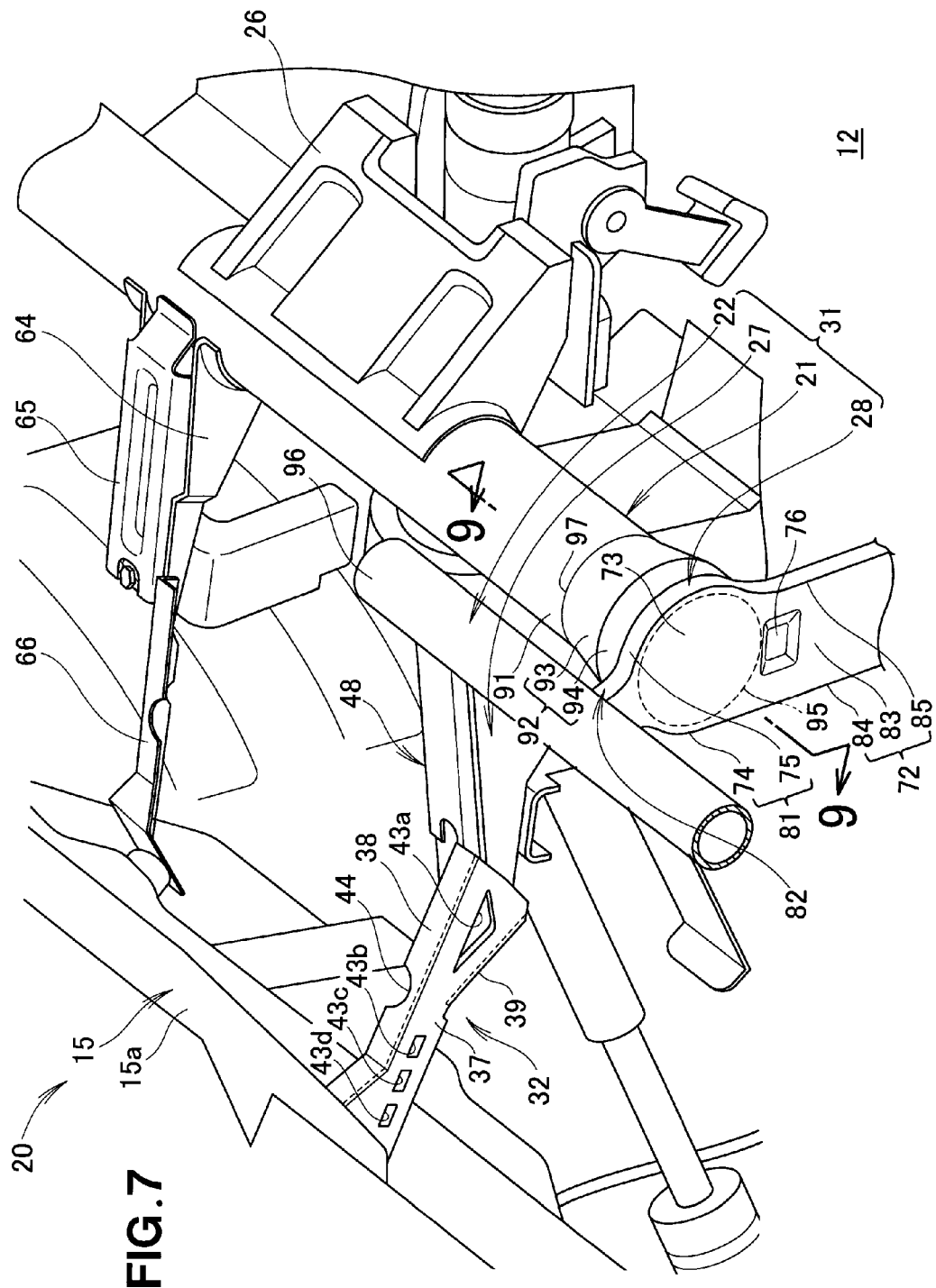
FIG. 7 is a perspective vie taken along arrowed line 7 of FIG. 3.

More specifically, as shown in FIGS. 3, 6, and 7, the first vehicle body connecting member 32 is a member for connecting the steering support bracket 27 (right beam connecting member 27) of the beam structure 31 to the dashboard 15. The first vehicle body connecting member 32 is configured from a member separate from the steering support bracket 27, and comprises a press-molded article made from a plate material such as a steel plate.

The dash connecting bracket 32 is a press-formed article made from a steel plate, and comprises a vertical plate-shaped lateral surface part 37, a horizontal plate-shaped top surface part 38 extending in the lateral direction from a top end of the lateral surface part 37, a horizontal plate-shaped bottom surface part 39 extending in the lateral direction from a bottom end of a rear-half portion of the lateral surface part 37, and a front surface part 41 extending downward from a front end of the lateral surface part 37.

A rear end of the lateral surface part 37 is joined to the steering support bracket 27. The front surface part 41 is joined to the dashboard 15.

A notch 42 and a plurality of relief holes 43a through 43d are formed in the dash connecting bracket 32 partway the front-rear direction of the vehicle body. In other words a notch 42 and a plurality of relief holes 43a through 43d are formed in the lateral surface part 37. The notch 42 is a cut-out portion of the bottom end of the lateral surface part 37 located partway in the front-rear direction. The relief holes 43a through 43d are through-holes penetrating through the lateral surface part 37 in the lateral direction. Proper strength and rigidity in the dash connecting bracket 32 are ensured by having the notch 42 and the plurality of relief holes 43a through 43d in the lateral surface part 37. A top-surface notch 44 for ensuring proper strength and rigidity is formed in the top surface part 38.

Figure 4:
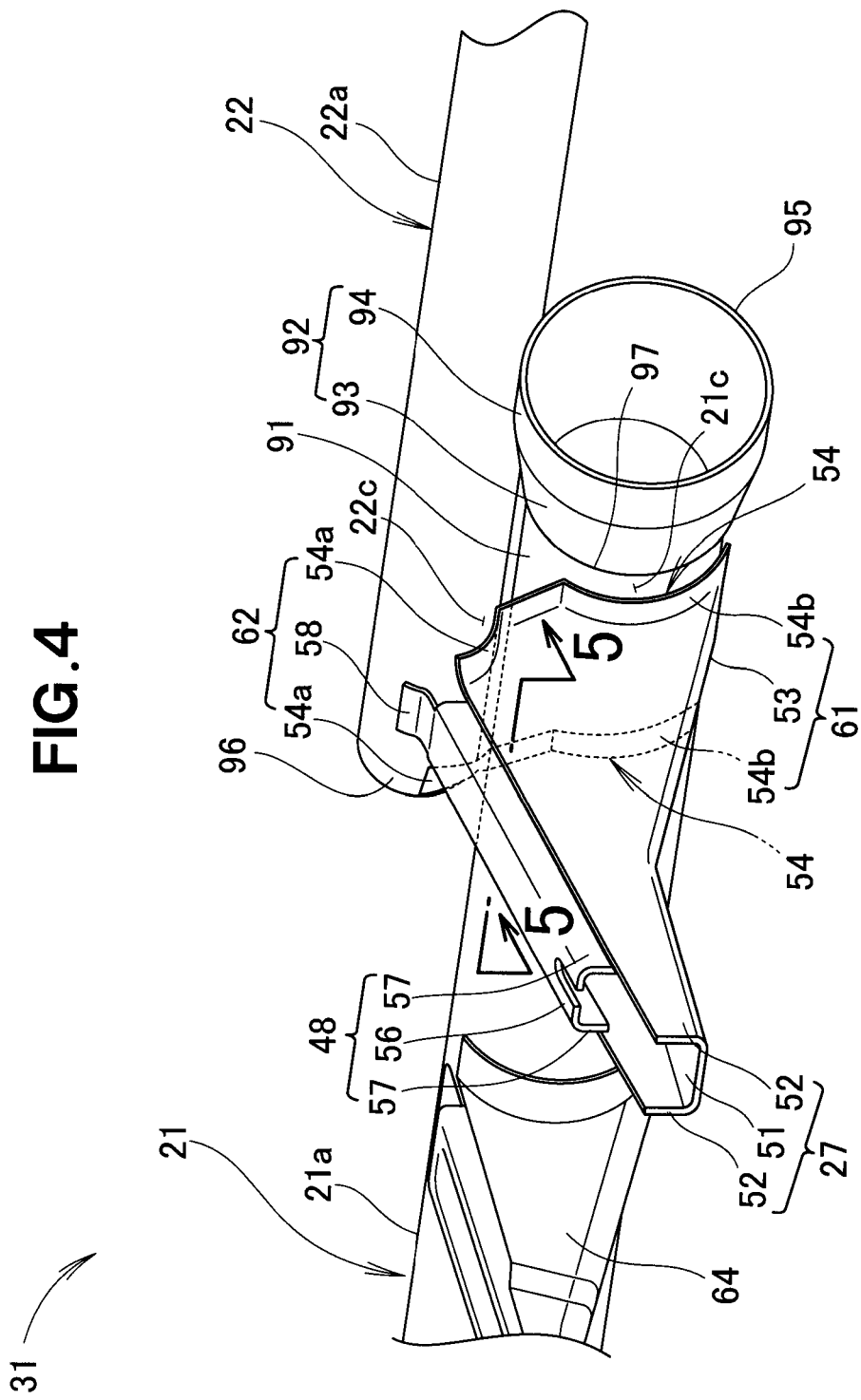
FIG. 4 is a perspective view showing a lateral center portion of a beam structure shown in FIG. 2, from in front of the vehicle body.
Figure 5:
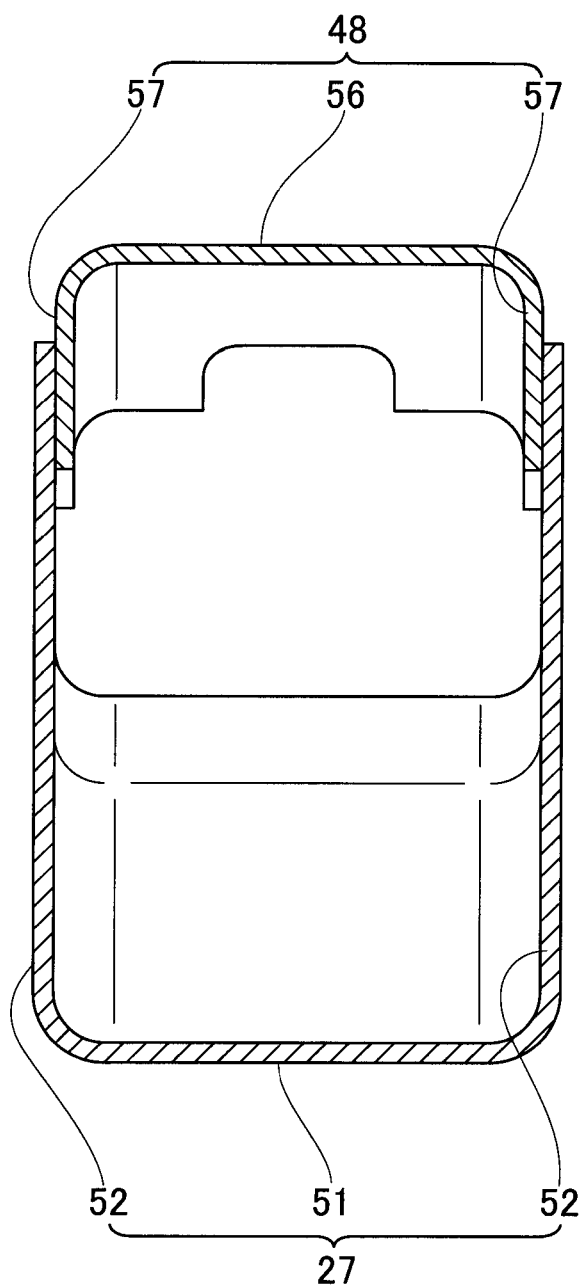
FIG. 5 is a sectional view taken along line 5-5 of FIG. 4.

As shown in FIGS. 4, 5, and 6, the steering support bracket 27 is formed having a substantially U-shaped cross-section, and the open end of the substantially U-shaped cross-section is closed by a cover 48. As a result, the steering support bracket 27 is formed as a substantially rectangular closed section. Specifically, the steering support bracket 27 is a press-molded article comprising a horizontal plate-shaped bottom surface part 51 and vertical plate-shaped left and right lateral surface parts 52, 52 extending upward from both lateral-direction ends of the bottom surface part 51.

In the steering support bracket 27, the sides 51, 52, 52 constituting the substantially U-shaped cross-section, i.e., the bottom surface part 51 and the left and right lateral surface parts 52, 52, are joined to at least one of the first beam 21 and the second beam 2.

Specifically, an extension piece 53 extending rearward is integrally formed at a rear end of the bottom surface part 51. The extension piece 53 is joined to a bottom surface 21b (see FIG. 6) of the first beam 21. Left and right flanges 54, 54 (left and right bent pieces 54, 54) extending out outward in the lateral direction are integrally formed at rear ends of the left and right lateral surface parts 52, 52. The left and right flanges 54, 54 are joined to a front surface 21c of the first beam 21 and a front surface 22c of the second beam 2.

As shown in FIGS. 4 through 6, the cover 48 is formed having a substantially inverted-U-shaped cross-section, and is a press-molded article comprising a horizontal plate-shaped top surface part 56 and vertical plate-shaped left and right cover side surface parts 57, 57 which extend downward from both ends in the lateral direction of the top surface part 56. A cover extension piece 58 extending upward and to the rear is integrally formed at a rear end of the top surface part 56.

As shown in FIG. 4, bottom parts 54b, 54b of the left and right flanges 54, 54 and the extension piece 53 constitute a first joint 61. The first joint 61 is joined to a distal-end part of the first beam 21 on the lateral center side thereof, i.e., to the vicinity of the end part 97 of the beam body 91. Top parts 54a, 54a of the left and right flanges 54, 54, and the cover extension piece 58 of the cover 48 constitute a second joint 62. The second joint 62 is joined to the distal-end part 96 of the second beam 22 on the lateral center side thereof. The steering support bracket 27 thus has the first joint 61 and the second joint 62.

As is clear from the above description, the extension piece 53 and the left and right flanges 54, 54 of the steering support bracket 27 are joined to the first beam 21 or the second beam 22. The extension piece 58 of the cover 48 is joined to either the distal-end part of the first beam 21 or the distal-end part 96 of the second beam 22. In other words, the sides 51, 52, 52 and the cover 48 of the steering support bracket 27 are joined to the first beam 21 or the second beam 22.

As shown in FIG. 7, the first beam 21 is connected to the dashboard 15 by a steering support bracket 64, a cover 65, and a dash connecting bracket 66. The steering support bracket 64 is positioned on the outside in the lateral direction relative to the steering column 26. The steering support bracket 64 is formed having a substantially U-shaped cross-section, in the same manner as the right beam connecting member 27 described above, and the open end of the substantially U-shaped cross-section is closed by the cover 65. As a result, the steering support bracket 64 is formed as a substantially rectangular closed section.

The cover 65 is formed having a substantially inverted-U-shaped cross-section, in the same manner as the cover 48. The dash connecting bracket 66 is a member for connecting the steering support bracket 64 to the dashboard 15. The dash connecting bracket 66 is configure from a member separate from the steering support bracket 64.

Figure 8:
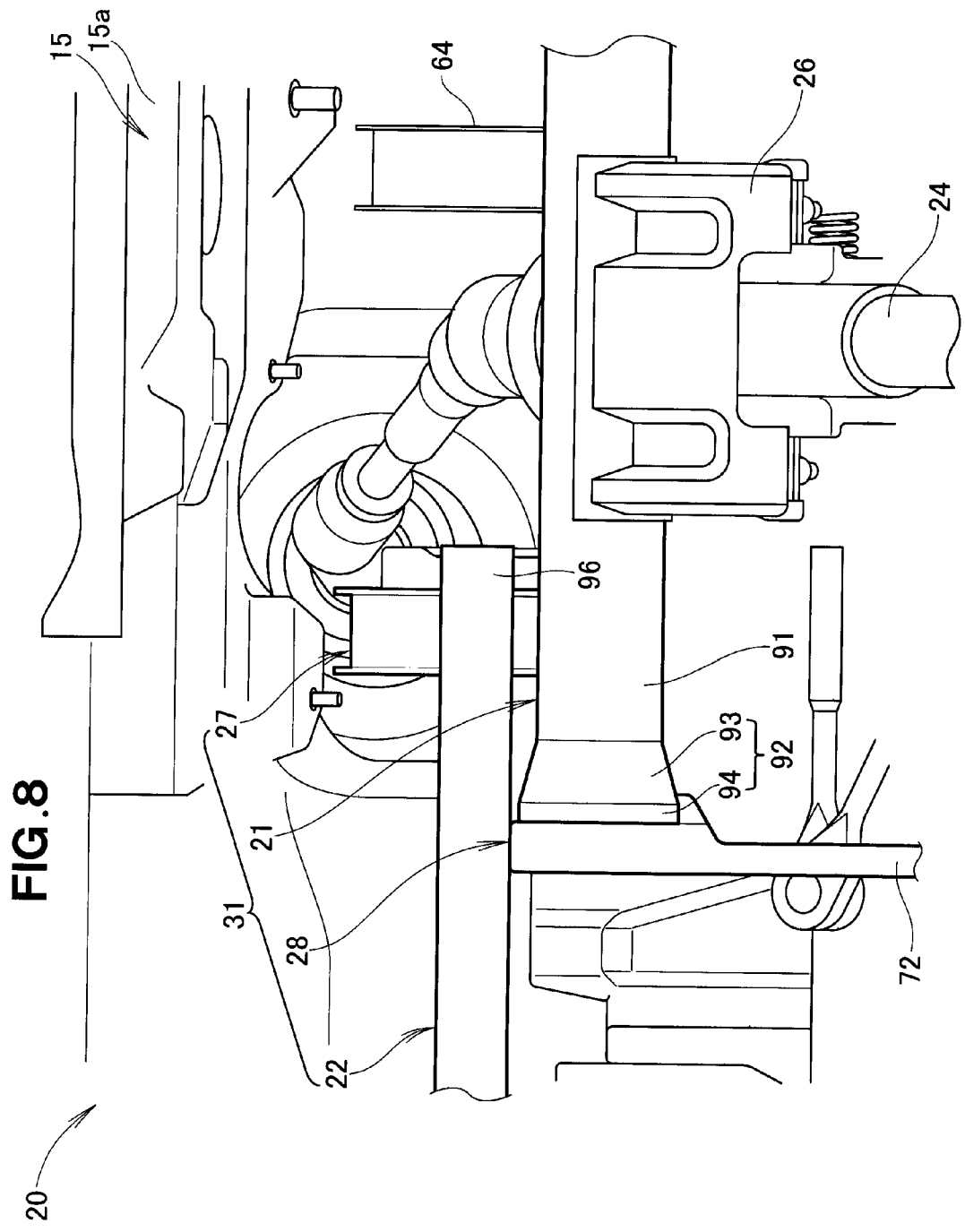
FIG. 8 is a perspective view as seen in the direction of arrow 8 of FIG. 3.

As shown in FIGS. 1, 2, and 8, the steering support bracket 27 is positioned on the lateral center side with respect to the steering column 26. The left beam connecting member 28 is positioned on the lateral center side a predetermined distance apart from the steering support bracket 27. A second vehicle body connecting member 72 is formed integrally with the left beam connecting member 28. The second vehicle body connecting member 72 extends downward from a bottom part of the left beam connecting member 28, and is supported by the floor panel 16. Specifically, the second vehicle body connecting member 72 is a member for connecting the first and second beams 21, 22 to the floor panel 16.

As shown in FIGS. 3, 6, 7, and 9, the left beam connecting member 28 comprises a facing surface part 73, a front surface joint 74, a rear surface joint 75, a bottom joint 76, and a top surface joint 77.

The facing surface part 73 is a flat plate-shaped portion facing an end surface 95 (end surface 95 of the large-diameter part 94) on the lateral center side of the first beam 21 so as to cover the end surface 95. The facing surface part 73 is separated from the end surface 95 across a gap.

The front surface joint 74 curves from an edge of the facing surface part 73 so as to follow the surface 21c (front surface 21c) on the vehicle-body front side of an external peripheral surface 21a of the first beam 21, and is joined to the surface 21c on the vehicle-body front side. More specifically, the front surface joint 74 is joined to the surface 21c on the vehicle-body front side of the large-diameter part 94.

The rear surface joint 75 curves from an edge of the facing surface part 73 so as to follow a surface 21d (rear surface 21d) on the vehicle-body rear side of the external peripheral surface 21a of the first beam 21, and is joined to the surface 21d on the vehicle-body rear side. More specifically, the rear surface joint 75 is joined to the surface 21d on the vehicle-body rear side of the large-diameter part 94.

The bottom joint 76 is positioned facing a bottom part of the circular end surface 95. The bottom joint 76 is a portion bulging toward the end surface 95 of the first beam 21 from the facing surface part 73, and is superposed on and joined to the end surface 95.

The left beam connecting member 28 is thus joined to the first beam 21 by the joining of the front surface joint 74, the rear surface joint 75, and the bottom joint 76 to the first beam 21. A first flange 81 is configured from the front surface joint 74 and the rear surface joint 75. The first flange 81 (first joint 81) extends from the facing surface part 73 so as to follow the first beam 21, and is joined to the external peripheral surface 21a of the first beam 21, i.e., to an external peripheral surface of the diameter expansion part 92.

The top surface joint 77 is a portion extending toward a surface 22b (bottom surface 22b) on a bottom side of an external peripheral surface 22a of the second beam 22 from edge of the facing surface part 73, and curving so as to follow the external peripheral surface 22a from an extending distal end, and is joined to the surface 22b on the bottom side of the external peripheral surface 22a. The top surface joint 77 is referred to as the "second flange 82" or the "second joint 82," as appropriate. Specifically, the top surface joint 77 corresponds to a second flange 82 (second joint 82). The diameter expansion part 92 is thus joined to the external peripheral surface 22a of the second beam 22 by the second flange 82.

As is clear from the above description, the left beam connecting member 28 has the first flange 81 and the second flange 82.

As shown in FIGS. 1, 3, and 6, the floor connecting frame 72 is a member having a substantially U-shaped cross-section that extends continuously toward the floor panel 16 from a bottom part of the left beam connecting member 28, and comprises a side wall 83, a front wall 84, and a rear wall 85.

The side wall 83 is a flat plate-shaped portion extending continuously toward the floor panel 16 from the facing surface part 73. A wall surface of the side wall 83 faces the lateral direction. The front wall 84 is a portion bent toward the right side of the vehicle body from a front end of the side wall 83, and extends continuously toward the floor panel 16 from the front surface joint 74. The rear wall 85 is a portion bent toward the right side of the vehicle body from a rear end of the side wall 83, and extends continuously toward the floor panel 16 from the rear surface joint 75.

The floor connecting frame 72 has a floor joint 86 at a bottom end thereof. The floor joint 86 is joined to the floor panel 16. For example, as shown in FIG. 1, a tunnel part 16a which bulges into the passenger compartment 12 is provided in the lateral center of the floor panel 16. The tunnel part 16a extends in the front-rear direction of the vehicle body. The floor joint 86 is joined directly, or indirectly via a bracket 16b, to a top part of the tunnel part 16a. As a result, the floor joint 86 is directly or indirectly joined to the floor panel 16.

Second Embodiment

Figure 10:
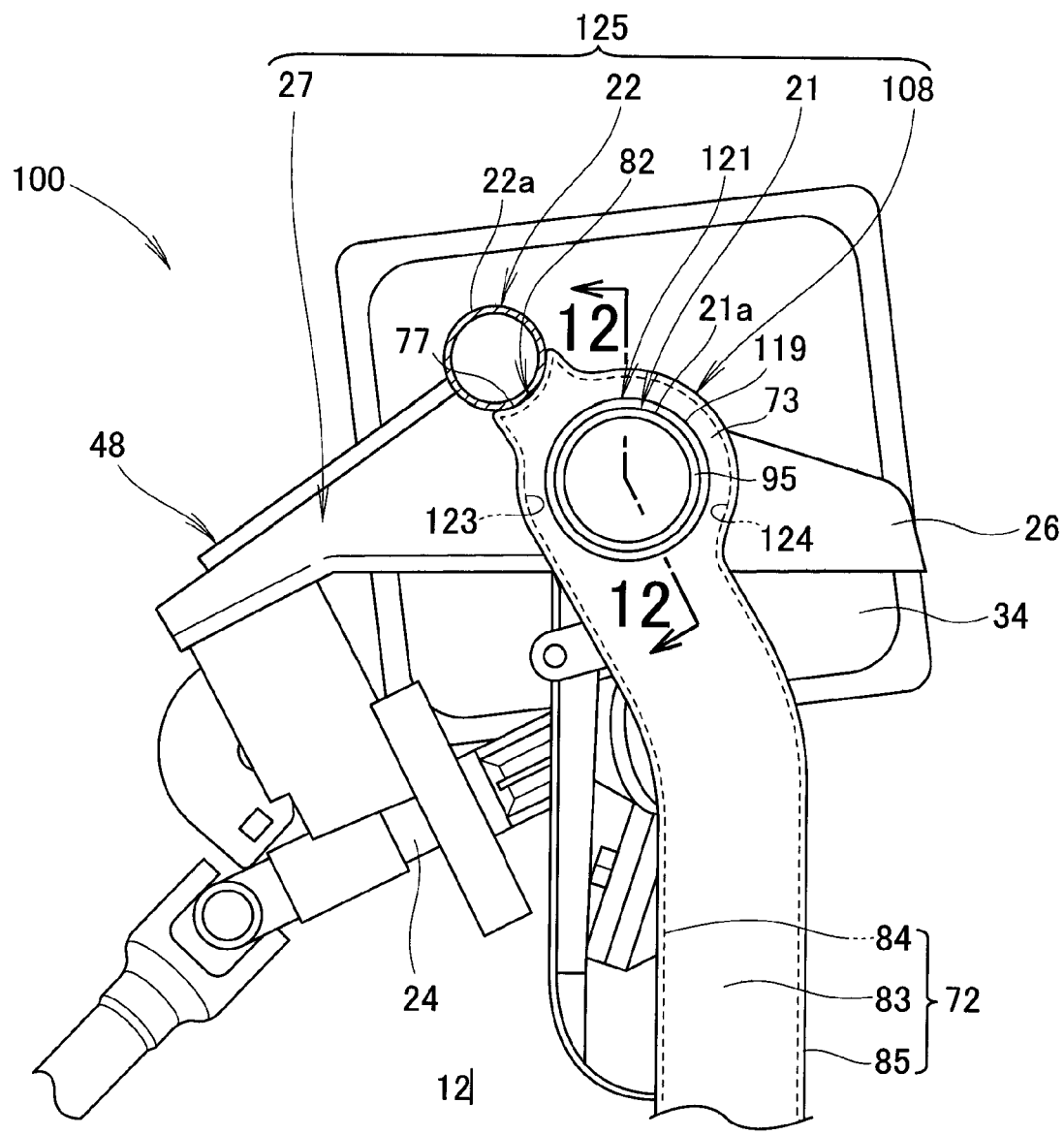
FIG. 10 is a sectional view showing a right half of the vehicular steering hanger assembly according to a second embodiment of the present invention, broken at a lateral center thereof.

The vehicular steering hanger assembly according to a second embodiment will be described with reference to FIGS. 10 through 12. FIG. 10 is a view corresponding to FIG. 6. FIG. 12 is a view corresponding to FIG. 9.

The steering hanger assembly 100 for a vehicle according to the second embodiment is characterized in that the left beam connecting member 28 of the first embodiment shown in FIGS. 6, 7, and 9 is changed to the left beam connecting member 108 shown in FIGS. 10 through 12. Other aspects of the configuration of the present embodiment are the same as in the configuration shown in FIGS. 1 through 9, and therefore will not be described.

The left beam connecting member 108 is a member for connecting the mutually overlapping distal-end parts of the first and second beams 21, 22, in the same manner as the left bean connecting member 28 of the first embodiment. The left beam connecting member 108 is referred to as the "second bracket 108," as appropriate. The second vehicle body connecting member 72, configured the same as in the first embodiment, is formed integrally with a bottom part of the left beam connecting member 108.

The left beam connecting member 108 has a first flange 121, the second flange 82, a front wall 123, and a rear wall 124.

The first flange 121 and the second flange 82 are formed in the facing surface part 73. The first flange 121 (first joint 121) is joined to the external peripheral surface 21a of the first beam 21, i.e., to the external peripheral surface of the large-diameter part 94. The first flange 121 comprises a through-hole 118 and a extension flange 119. The second flange 82 (second joint 82) is configured the same as in the first embodiment, and is configured from the top surface joint 77.

The left beam connecting member 108 is described in detail below. The left beam connecting member 108 comprises the facing surface part 73, the top surface joint 77, the through-hole 118, and the extension flange 119. The facing surface part 73 and the top surface joint 77 have essentially the same configuration as in the first embodiment.

The extension flange 119 is an annular portion extending in the longitudinal direction of the first beam 21 from an edge 118a of the through-hole 118. The extension flange 119 extends in the opposite direction from the right hanger support 34 (see FIG. 1). The inside diameter of the annular extension flange 119 is the same as the diameter of the through-hole 118, and is sized to allow fitting of the large-diameter part 94 of the first beam 21. The large-diameter part 94 is fitted together with the internal peripheral surfaces of the through-hole 118 and the extension flange 119, and is joined to the extension flange 119.

The length of the first beam 21 has a fabrication tolerance. However, the passing of the first beam 21 through the through-hole 118 and the annular extension flange 119 enables the length tolerance of the first beam 21 to be absorbed.

The facing surface part 73 also has the extension flange 119. There is therefore no need for the facing surface part 73 to be provided with the bottom joint 76 (see FIG. 7) of the first embodiment. Specifically, there is no need for the bottom joint 76 to bulge from the facing surface part 73. As a result, the formability of the left beam connecting member 108 is increased.

The through-hole 118 and the extension flange 119 are formed by burring the flat plate-shaped facing surface part 73. The through-hole 118 and the extension flange 119 can therefore be easily formed.

The front all 123 is a portion bent toward the right side of the vehicle body from the front end of the facing surface part 73, and continues to the front all 84 of the vehicle body connecting member 72. The rear wall 124 is a portion bent toward the right side of the vehicle body from a rear end of the facing surface part 73, and continues to the rear wall 85 of the vehicle body connecting member 72.

The beam structure 125 according to the second embodiment comprises the first beam 21, the second beam 22, the right beam connecting member 27, and the left beam connecting member 108. The basic configuration of the beam structure 125 is the same as that of the beam structure 31 of the first embodiment shown in FIGS. 1 through 9, and the beam structure 125 is characterized in that the role of the left beam connecting member 28 in the first embodiment described above is performed by the left beam connecting member 108.

The beam structure 125 is positioned within the passenger compartment 12 shown in FIG. 1. Specifically, the beam structure 125 is positioned higher than the floor panel 16 and close to the dashboard 15 (to the rear of the dashboard 15). The beam structure 125 is joined by the first vehicle body connecting member 32 to the dashboard 15 positioned in front of the beam structure 125, and is joined by the second vehicle body connecting member 72 to the floor panel 16 positioned below the beam structure 125.

Specifically, the beam structure 125 is connected to a vehicle body constituent member 15 of the vehicle body 11 shown in FIGS. 1 and 2 other than the left and right front pillars 17L, 17R, i.e., to the dashboard 15 as well, by the first vehicle body connecting member 32. The beam structure 125 is connected to a vehicle body constituent member 16 of the vehicle body 11 other than the left and right front pillars 17L, 17R, i.e., to the floor panel 16 as well.

Third Embodiment

Figure 13:
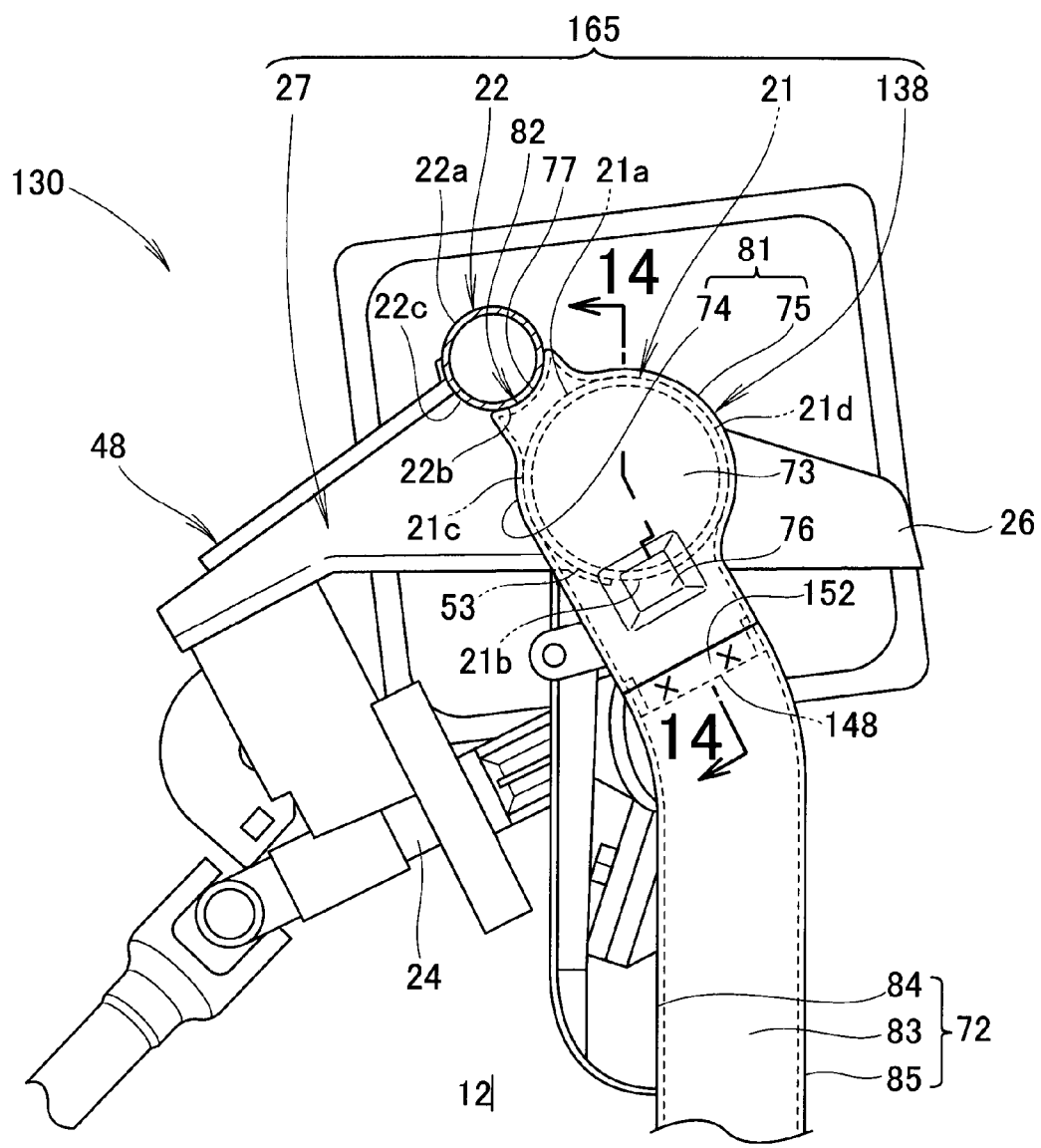
FIG. 13 is a sectional view showing a right half of a vehicular steering hanger assembly according to a third embodiment of the present invention, broken at the lateral center thereof.
Figure 14:
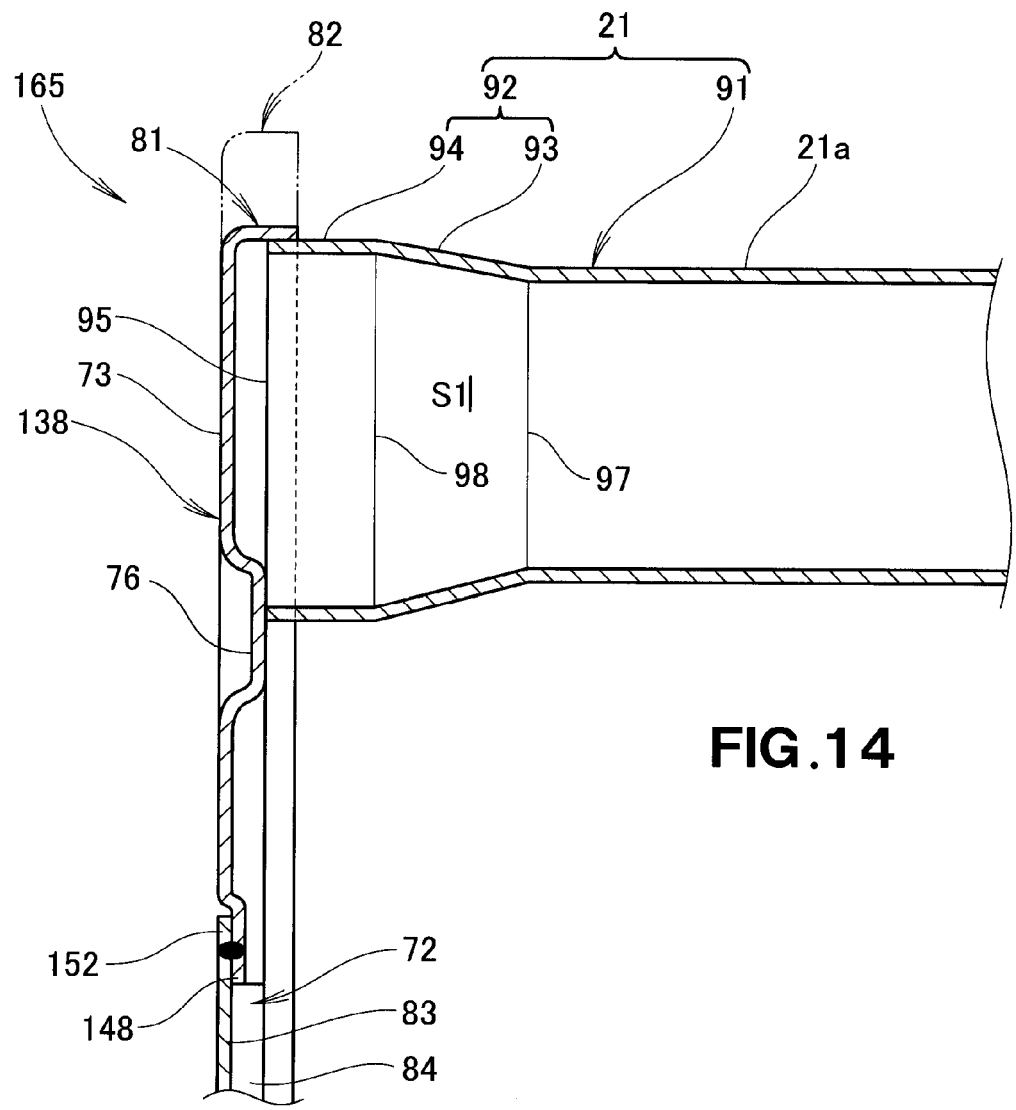
FIG. 14 is a sectional view taken along line 14-14 of FIG. 13.

The vehicular steering hanger assembly according to a third embodiment will be described with reference to FIGS. 13 and 14. FIG. 13 is a view corresponding to FIG. 6. FIG. 14 is a view corresponding to FIG. 9.

The steering hanger assembly 130 for a vehicle according to the third embodiment is characterized in that the left beam connecting member 28 of the first embodiment shown in FIGS. 6, 7, and 9 is changed to the left beam connecting member 138 shown in FIGS. 13 and 14. Other aspects of the configuration of the present embodiment are the same as in the configuration shown in FIGS. 1 through 9, and therefore will not be described.

The left beam connecting member 138 is a member for connecting the mutually overlapping distal-end parts of the first and second beams 21, 22, in the same manner as the left beam connecting member 28 of the first embodiment. The left beam connecting member 138 is referred to as the "second bracket 138," as appropriate.

The second vehicle body connecting member 72 is configured from a member separate from the left beam connecting member 138. Specifically, a vehicle-body-side joint 148 is formed at a bottom end of the left beam connecting member 138. A beam joint 152 is formed at a top end of the second vehicle body connecting member 72. The beam joint 152 is superposed on the vehicle-body-side joint 148 from a side thereof, and is joined to the vehicle-body-side joint 148 by welding (spot welding or the like) or bolt fastening.

A beam structure 165 according to the third embodiment comprises the first beam 21, the second beam 22, the right beam connecting member 27, and the left beam connecting member 138. The basic configuration of the beam structure 165 is the same as that of the beam structure 31 of the first embodiment shown in FIGS. 1 through 9, and the beam structure 165 is characterized in that the role of the left beam connecting member 28 in the first embodiment described above is performed by the left beam connecting member 138.

The beam structure 165 is positioned within the passenger compartment 12 shown in FIG. 1. Specifically, the beam structure 165 is positioned higher than the floor panel 16 and close to the dashboard 15 (to the rear of the dashboard 15). The beam structure 165 is joined by the first vehicle body connecting member 32 to the dashboard 15 positioned in front of the beam structure 165, and is joined by the second vehicle body connecting member 72 to the floor panel 16 positioned below the beam structure 165.

Specifically, the beam structure 165 is connected to a vehicle body constituent member 15 of the vehicle body 11 shown in FIGS. 1 and 2 other than the left and right front pillars 17L, 17R, i.e., to the dashboard 15 as well, by the first vehicle body connecting member 32. The beam structure 165 is connected to a vehicle body constituent member 16 of the vehicle body 11 other than the left and right front pillars 17L, 17R, i.e., to the floor panel 16 as well.

Fourth Embodiment

Figure 15:
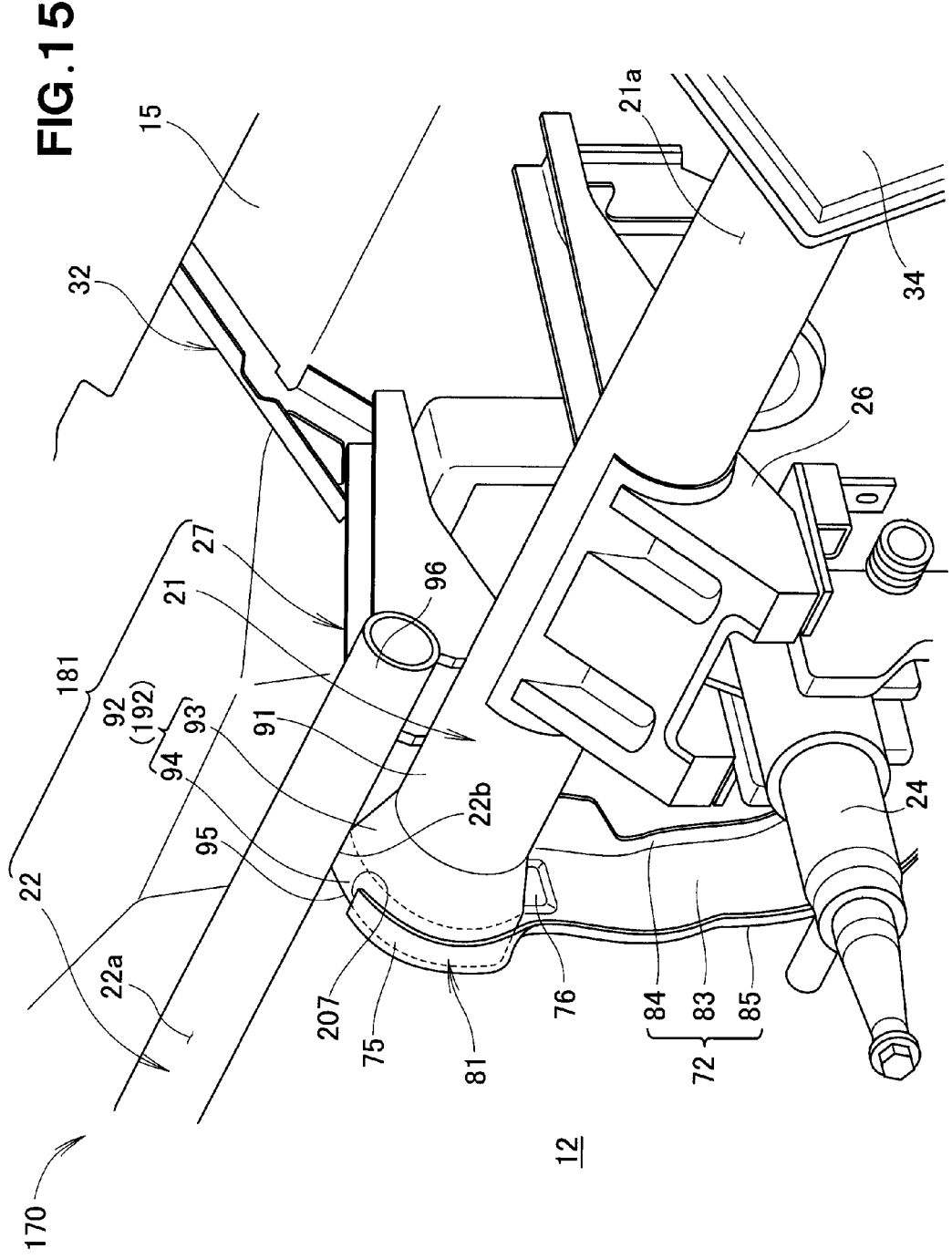
FIG. 15 is a perspective view showing the lateral center portion of a vehicular steering hanger assembly according to a fourth embodiment of the present invention.
Figure 16:
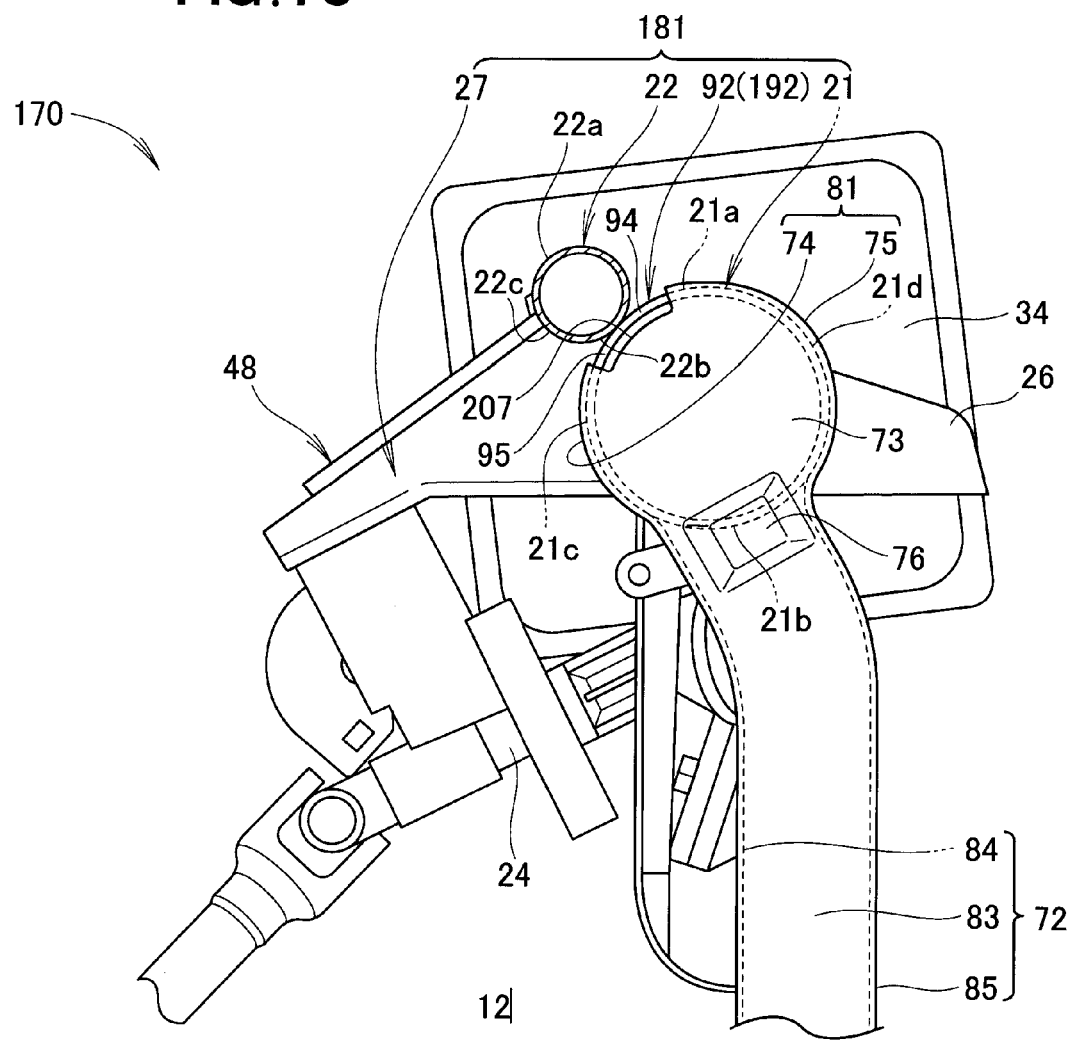
FIG. 16 is a sectional view showing a right half of the vehicular steering hanger assembly of FIG. 15, broken at the lateral center thereof.

The vehicular steering hanger assembly according to a fourth embodiment will be described with reference to FIGS. 15 and 16. FIG. 15 is a view corresponding to FIG. 3. FIG. 16 is a view corresponding to FIG. 6.

The steering hanger assembly 170 for a vehicle according to the fourth embodiment is characterized in that the beam structure 31 of the first embodiment shown in FIGS. 3 and 6 is changed to the beam structure 181 shown in FIGS. 15 and 16. Other aspects of the configuration of the present embodiment are the same as in the configuration shown in FIGS. 1 through 9, and therefore will not be described.

A top surface clearance part 207 is formed in the facing surface part 73. The top surface clearance part 207 is a portion that is cut out so as to range from the facing surface part 73 to the front surface joint 74, and allows the large-diameter part 94 of the diameter expansion part 92 to abut the bottom surface 22b of the second beam 22 at a rear position thereof.

The formation of the top surface clearance part 207 makes it possible for the large-diameter part 94 to directly contact the external peripheral surface 22a of the second beam 22.

An external peripheral surface of the large-diameter part 94 is directly adjacent to the external peripheral surface 22a of the second beam 22, and is joined directly to the external peripheral surface 22a. As a result, the large-diameter part 94 connects the mutually overlapping distal-end parts of the first and second beams 21, 22. Consequently, the diameter expansion part 92 can perform the role of the left beam connecting member 28 (second bracket 28) of the first embodiment.

The beam structure 181 according to the fourth embodiment comprises the first beam 21, the diameter expansion part 92 of the first beam 21, the second beam 22, and the right beam connecting member 27. The basic configuration of the beam structure 181 is the same as that of the beam structure 31 of the first embodiment, and the beam structure 181 is characterized in that the role of the left beam connecting member 28 (see FIG. 6) in the first embodiment described above is performed by the diameter expansion part 92.

As shown in FIG. 1, the beam structure 181 is positioned within the passenger compartment 12. Specifically, the beam structure 181 is positioned higher than the floor panel 16 and close to the dashboard 15 (to the rear of the dashboard 15). The beam structure 181 is joined by the first body connecting member 32 to the dashboard 15 positioned in front of the beam structure 181, and is joined by the second vehicle body connecting member 72 to the floor panel 16 positioned below the beam structure 181.

Specifically, the beam structure 181 is connected to a vehicle body constituent member 15 of the vehicle body 11 shown in FIGS. 1 and 2 other than the left and right front pillars 17L, 17R, i.e., to the dashboard 15 as well, by the first vehicle body connecting member 32. The beam structure 181 is connected to a vehicle body constituent member 16 of the vehicle body 11 other than the left and right front pillars 17L, 17R, i.e., to the floor panel 16 as well.

Fifth Embodiment

The vehicular steering hanger assembly according to a fifth embodiment will be described with reference to FIGS. 17 through 19. FIG. 19 is a view corresponding to FIG. 12.

Figure 17:
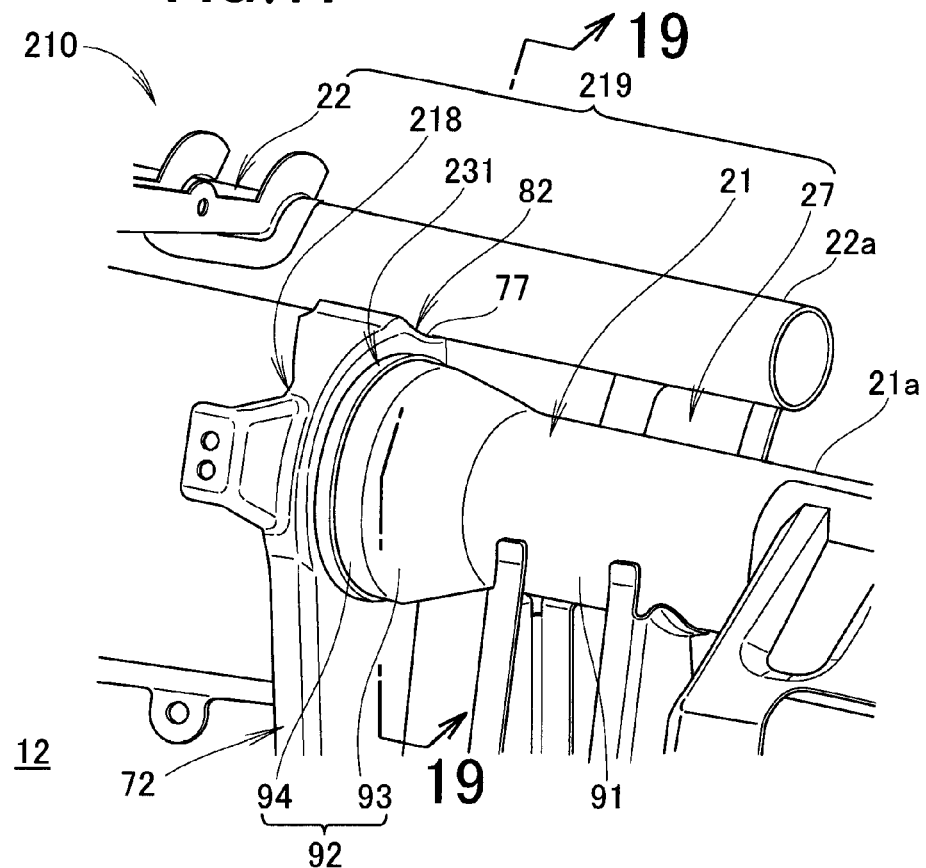
FIG. 17 is a perspective view showing a lateral center portion of a vehicular steering hanger assembly according to a fifth embodiment of the present invention.
Figure 18:
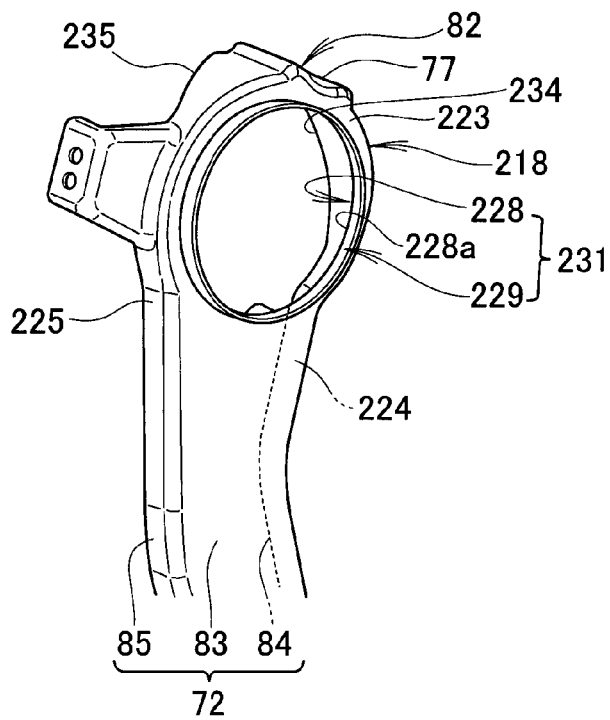
FIG. 18 is a perspective view showing a second flange and a floor connecting frame shown in FIG. 17.
Figure 19:
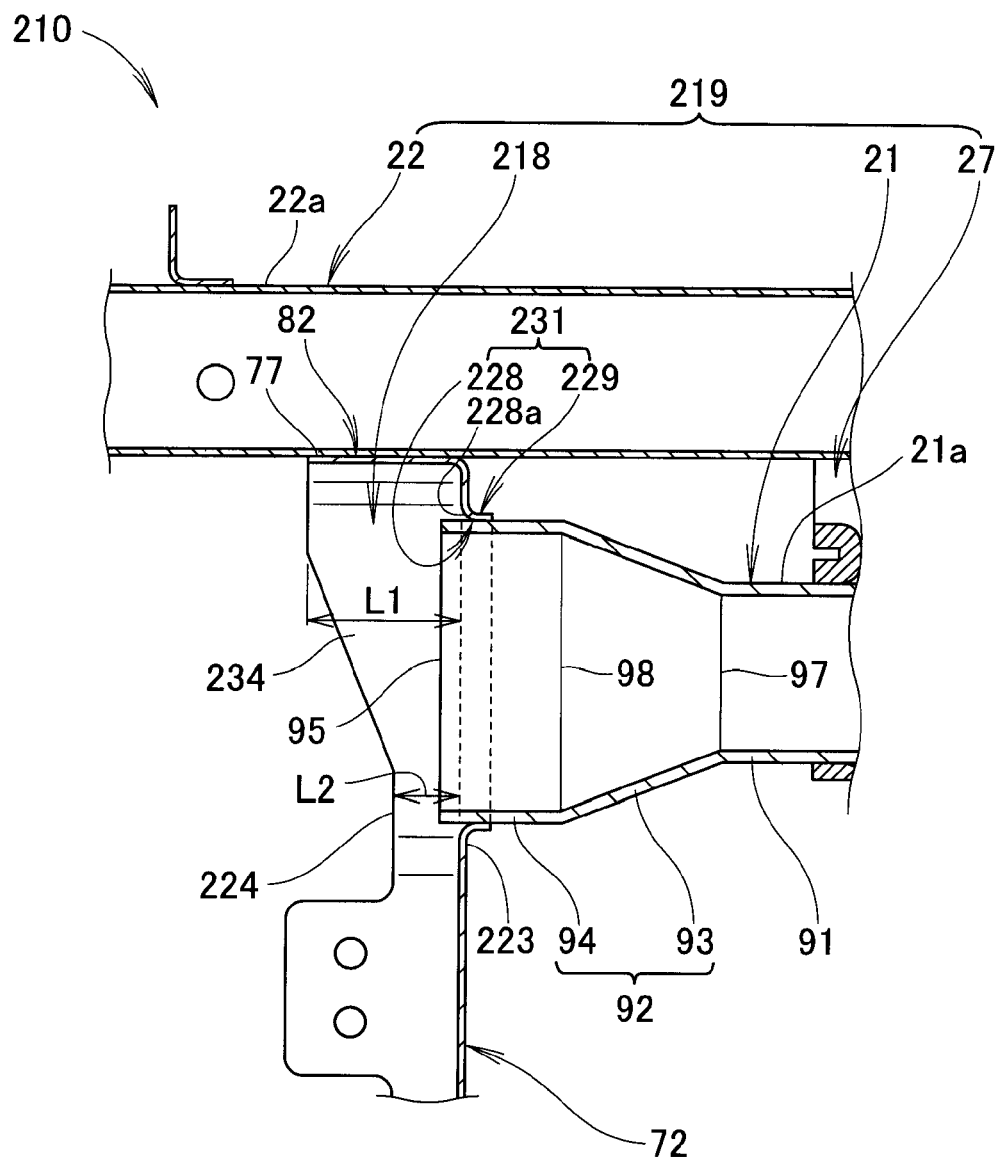
FIG. 19 is a sectional view taken along 19-19 of FIG. 17.

The steering hanger assembly 210 for a vehicle according to the fifth embodiment is characterized in that the left beam connecting member 108 of the second embodiment shown in FIGS. 10 through 12 is changed to the left beam connecting member 218 shown in FIGS. 17 through 19. Other aspects of the configuration of the present embodiment are the same as in the configurations shown in FIGS. 1 through 9 and 17 through 19, and therefore will not be described.

The left beam connecting member 218 is a member for connecting the mutually overlapping distal-end parts of the first and second beams 21, 22, in the same manner as the left beam connecting member 108 of the second embodiment. The left beam connecting member 218 is referred to as the "second bracket 218," as appropriate.

The second vehicle body connecting member 72 of the fifth embodiment is configured the same as in the second embodiment, and is formed integrally with a bottom part of the left beam connecting member 218. However, the floor connecting frame 72 of the fifth embodiment is formed having a substantially U-shaped cross-section which is open toward the left side of the vehicle body.

The left beam connecting member 218 is a member for connecting the mutually overlapping distal-end parts of the first and second beams 21, 22, in the same manner as the left beam connecting member 108 of the second embodiment. The left beam connecting member 218 is referred to as the "second bracket 218," as appropriate. The second vehicle body connecting member 72, configured the same as in the first embodiment, is formed integrally with the bottom part of the left beam connecting member 218.

The left beam connecting member 218 has a first flange 231, the second flange 82 (separate flange 82), a front wall 224, a rear wall 225, and inclined flanges 234, 235.

The first flange 231 and the second flange 82 are formed in a facing surface part 223. The first flange 231 (first joint 231) is joined to the external peripheral surface 21a of the first beam 21, i.e., to the external peripheral surface of the large-diameter part 94. The first flange 231 comprises a through-hole 228 and an extension flange 229. The second flange 82 (second joint 82) is configured the same as in the second embodiment, and is configured from the top surface joint 77.

The left beam connecting member 218 is described in detail below. The left beam connecting member 218 comprises the facing surface part 223, the top surface joint 77, the through-hole 228, and the extension flange 229. The facing surface part 223 has essentially the same configuration as the facing surface part 73 in the second embodiment. The top surface joint 77 has essentially the same configuration as in the second embodiment.

The extension flange 229 is an annular portion extending in the longitudinal direction of the first beam 21 from an edge 228a of the through-hole 228. The extension flange 229 extends toward the right hanger support 34 (see FIG. 1). The inside diameter of the annular extension flange 229 is the same as the diameter of the through-hole 228, and is sized to allow fitting of the large-diameter part 94 of the first beam 21. The large-diameter part 94 is fitted together with the internal peripheral surfaces of the through-hole 228 and the extension flange 229, and is joined to the extension flange 229.

The length of the first beam 21 has a fabrication tolerance. However, the passing of the first beam 21 through the through-hole 228 and the annular extension flange 229 enables the length tolerance of the first beam 21 to be absorbed.

The facing surface part 223 also has the extension flange 229. There is therefore no need for the facing surface part 223 to be provided with the bottom joint 76 (see FIG. 7) of the first embodiment. Specifically, there is no need for the bottom joint 76 to bulge from the facing surface part 223. As a result, the formability of the left beam connecting member 218 is increased.

The through-hole 228 and the extension flange 229 are formed by burring the flat plate-shaped facing surface part 223. The through-hole 228 and the extension flange 229 can therefore be easily formed.

The front wall 224 is a portion bent toward the left side of the vehicle body from the front end of the facing surface part 223, and continues to the front wall 84 of the vehicle body connecting member 72. The front wall 224 has essentially the same configuration as the front wall 123 of the second embodiment. The rear wall 225 is a portion bent toward the left side of the vehicle body from a rear end of the facing surface part 223, and continues to the rear wall 85 of the vehicle body connecting member 72. The rear wall 225 has essentially the same configuration as the rear wall 124 of the second embodiment.

Furthermore, the front wall 224 has the front-side inclined flange 234 in a top part thereof. The rear wall 225 has the rear-side inclined flange 235 in a top part thereof. Specifically, the top portion of the front wall 224 is configured from the front-side inclined flange 234. The top portion of the rear wall 225 is configured from the rear-side inclined flange 235.

The front and rear inclined flanges 234, 235 extend from the facing surface part 223 in the extension direction of the separate flange 82. The inclined flanges 234, 235 are formed so as to follow the edge of the facing surface part 223 from the separate flange 82 at least through the region where the extension flange 229 is formed.

As shown in FIG. 19, the extension lengths of the front and rear inclined flanges 234, 235 with respect to the facing surface part 223 are set such that the portion adjacent to the second flange 82 is set to L1, and a bottom-end portion is set to L2. The extension length L2 of the bottom-end portion is smaller than the extension length L1 of the portion adjacent to the second flange 82. The extension lengths L1, L2 of the front and rear inclined flanges 234, 235 are thus set so as to gradually decrease from the second flange 82 (separate flange 82) to the region where the extension flange 229 is formed.

A beam structure 219 according to the fifth embodiment comprises the first beam 21, the second beam 22, the right beam connecting member 27, and the left beam connecting member 218. The basic configuration of the beam structure 125 is the same as that of the beam structure 31 of the first embodiment shown in FIGS. 1 through 9, and the beam structure 125 is characterized in that the role of the left beam connecting member 28 in the first embodiment described above is performed by the left beam connecting member 218.

The beam structure 219 is positioned within the passenger compartment 12 shown in FIG. 1. Specifically, the beam structure 219 is positioned higher than the floor panel 16 and close to the dashboard 15 (to the rear of the dashboard 15). The beam structure 219 is joined by the first vehicle body connecting member 32 to the dashboard 15 positioned in front of the beam structure 219, and is joined by the second vehicle body connecting member 72 to the floor panel 16 positioned below the beam structure 125.

Specifically, the beam structure 219 is connected to a vehicle body constituent member 15 of the vehicle body 11 shown in FIGS. 1 and 2 other than the left and right front pillars 17L, 17R, i.e., to the dashboard 15 as well, by the first vehicle body connecting member 32. The beam structure 125 (*2) is connected to a vehicle body constituent member 16 of the vehicle body 11 other than the left and right front pillars 17L, 17R, i.e., to the floor panel 16 as well.

In the present invention, each of the steering hanger assemblies 20, 100, 130, 170, 210 for a vehicle according to the first through fifth embodiments may be configured so as to be combinable as appropriate.

The steering hanger assemblies 20, 100, 130, 170, 210 for a vehicle are also not limited to a right-hand-drive vehicle 10, and can be employed in a left-hand-drive vehicle.

The first beam 21 can also be disposed on the left side of the vehicle body 11, and the second beam 22 can be disposed on the right side of the vehicle body 11.

As shown in FIG. 1, the floor connecting frame 28 is connected to the floor panel 16, but this configuration is not limiting, and the floor connecting frame 28 may be connected to the dashboard lower panel 15a, for example.

A configuration is also included in which the vehicle body connecting members 32, 72 are positioned apart in the lateral direction from the left and right beam connecting members 27, 28.

INDUSTRIAL APPLICABILITY

The vehicular steering hanger assembly pertaining to the present invention is suitable for application in a passenger car such as a sedan or a wagon.

REFERENCE SIGNS LIST 11 vehicle body
15 other vehicle body constituent member (dashboard)
16 other vehicle body constituent member (floor panel)
17R right front pillar
17L left front pillar
20, 100, 130, 170, 210 steering hanger assembly for vehicle
21 first beam (one beam, pipe)
21a external peripheral surface
21b bottom surface of external peripheral surface
21c front surface of external peripheral surface
21d rear surface of external peripheral surface
22 second beam (other beam)
22a external peripheral surface of other beam
26 steering column
27, 192 left and right beam connecting members
27 right beam connecting member (steering support bracket)
28, 108, 138, 192, 218 left beam connecting member (one beam connecting member)
31, 125, 165, 181, 219 beam structure
32 vehicle body connecting member
42 notch
48 cover
53, 54 sides constituting substantially U-shaped cross-section
61 first joint
62 second joint
72 vehicle body connecting member (floor connecting frame)
73 facing surface part
74 front surface joint
75 rear surface joint
76 bottom joint
81, 121, 231 flange (first flange 81)
82 separate flange (second flange)
83 side wall
84 front wall
85 rear wall
91 beam body
92 diameter expansion part at end part on lateral center side of beam body
93 tapered part
94 large-diameter part
95 end surface on lateral center side of one beam
97 end part on lateral center side of beam body (boundary between beam body and tapered part)
98 end on large-diameter side of tapered part (boundary between tapered part and large-diameter part)
99 outside line of tapered part
113 facing surface part
118, 218 through-hole
118a, 228a edge of through-hole
119, 229 annular extension flange
192 one beam connecting member
218 one beam connecting member
223 facing surface part
234, 235 inclined flanges
L1, L2 extension lengths of inclined flanges
S1 trapezoid part

The invention claimed is:
1. A vehicular steering hanger assembly for supporting a steering column, comprising:

a first beam extending toward a lateral center from a right front pillar;

a second beam extending toward the lateral center from a left front pillar, a distal-end part of the second beam on the center side thereof overlapping with a distal-end part of the first beam on the center side thereof with or without a gap therebetween in a front-rear direction and/or a top-bottom direction of a vehicle body;

a left beam connecting member and a right beam connecting member spaced from the left beam connecting member, the mutually spaced left and right beam connecting members connecting the mutually overlapping distal-end parts of the first and second beams;

a beam structure being configured from the mutually overlapping distal-end parts of the first and second beams and the mutually spaced left and right beam connecting members connecting the mutually overlapping distal-end parts of the first and second beams; and a vehicle body connecting member connecting the beam structure to a vehicle body constituent member of the vehicle body other than the left and right front pillars.

2. The vehicular steering hanger assembly according to claim 1, wherein the other vehicle body constituent member than the left and right front pillars is a dashboard positioned in front of the beam structure.

3. The vehicular steering hanger assembly according to claim 2, wherein at least one of the left and right beam connecting members comprises a steering support bracket for supporting the steering column, and the vehicle body connecting member comprises a member of the beam structure and is adapted for connecting the steering support bracket to the dashboard, the vehicle body connecting member comprising a member separate from the steering support bracket.

4. The vehicular steering hanger assembly according to claim 3, wherein the steering support bracket has a first joint joined to the distal-end part of the first beam and a second joint joined to the distal-end part of the second beam.

5. The vehicular steering hanger assembly according to claim 3, wherein the steering support bracket is formed to have a substantially U-shaped cross-section, and an open end of the substantially U-shaped cross-section is closed by a cover.

6. The vehicular steering hanger assembly according to claim 5, wherein sides constituting the substantially U-shaped cross-section of the steering support bracket are joined to one of the first and second beams, and the cover is joined to the distal-end part of the first beam and/or the distal-end part of the second beam.

7. The vehicular steering hanger assembly according to claim 2, wherein the vehicle body connecting member comprises a press-molded plate, and a notch is formed therein at a location partway in a front-rear direction of the vehicle body.

8. The vehicular steering hanger assembly according to claim 1, wherein:

the other vehicle body constituent member is a floor panel positioned below the beam structure;

the vehicle body connecting member is a member extending to the floor panel from any one beam connecting member including the right beam connecting member and the left beam connecting member;

the one beam connecting member has a flange; and the flange extends from the one beam connecting member so as to follow an external peripheral surface of any one beam of the first and second beams and is joined to the external peripheral surface.

9. The vehicular steering hanger assembly according to claim 8, wherein the one beam connecting member having a facing surface part facing an end surface of the one beam on a lateral center side thereof; and the flange extending so as to follow the external peripheral surface of the one beam from the facing surface part in the one beam connecting member.

10. The vehicular steering hanger assembly according to claim 9, wherein:

the flange includes a front surface joint joined to a front surface in the external peripheral surface of the one beam, and a rear surface joint joined to a rear surface in the external peripheral surface;

the vehicle body connecting member is a member having a substantially U-shaped cross-section in plan view and comprising a side wall extending downward from a bottom end of the facing surface part, a front wall extending downward from a bottom end of the front surface joint, and a rear wall extending downward from a bottom end of the rear surface joint;

the one beam connecting member has a bottom joint protruding from the facing surface part toward a bottom part of an end surface of the one beam on the lateral center side thereof; and the bottom joint is joined to the bottom part of the end surface.

11. The vehicular steering hanger assembly according to claim 8, wherein the one beam connecting member has, besides the flange, a separate flange joined to the other of any of the first and second beams, and the separate flange is a portion extending from an edge of the facing surface part so as to follow the external peripheral surface of the other beam, and being joined to the external peripheral surface.

12. The vehicular steering hanger assembly according to claim 8, wherein the flange has a through-hole formed in a facing surface part of the one beam connecting member facing the lateral direction, the one beam being able to pass through the through-hole, and an annular extension flange extending from an edge of the through-hole so as to follow the external peripheral surface of the one beam.

13. The vehicular steering hanger assembly according to claim 12, wherein the one beam connecting member has, besides the flange, a separate flange joined to the other of any of the first and second beams;

the separate flange is a portion extending from an edge of the facing surface part along the external peripheral surface of the other beam toward the front pillar on the side on which the other beam is joined, and being joined to the external peripheral surface; and the extension flange extends toward the front pillar on the side on which the one beam is joined.

14. The vehicular steering hanger assembly according to claim 13, wherein the one beam connecting member has an inclined flange extending in the extension direction of the separate flange from the facing surface part;

the inclined flange is formed so as to follow an edge of the facing surface part from the separate flange at least through a region where the extension flange is formed; and the extension length of the inclined flange is set so as to gradually decrease from the separate flange to the region.

15. The vehicular steering hanger assembly according to claim 12, wherein the through-hole and the extension flange are a hole and an annular flange formed by burring the facing surface part.

16. The vehicular steering hanger assembly according to claim 1, wherein
at least one of the first and second beams comprises a pipe;
the pipe comprises a beam body and a diameter expansion part at an end part of the beam body on the lateral center side thereof; and
the diameter of the diameter expansion part is greater than the diameter of the beam body.

17. The vehicular steering hanger assembly according to claim 16, wherein the diameter expansion part is joined directly to an external peripheral surface of the other of any of the first and second beams, whereby one beam connecting member of any of the left and right beam connecting members is configured from the diameter expansion part.

18. The vehicular steering hanger assembly according to claim 16, wherein the diameter expansion part includes a tapered part, the diameter of which increases toward the diameter expansion part from the beam body.

19. The vehicular steering hanger assembly according to claim 16, wherein the one beam connecting member of any of the left and right beam connecting members has:
a first flange superposed on and joined to an external peripheral surface of the diameter expansion part of the one beam; and
a second flange superposed on and joined to the external peripheral surface of the other beam.

20. The vehicular steering hanger assembly according to claim 19, wherein
the diameter expansion part includes a large-diameter part adjoining an end of the tapered part on a large-diameter side thereof;
the diameter of the large-diameter part is set to be the same as the diameter of the end of the tapered part on the large-diameter side thereof; and
the first flange is joined to the large-diameter part.

21. The vehicular steering hanger assembly according to claim 20, wherein
the diameter expansion part has a trapezoid part, where the boundary between the beam body and the tapered part is a top side thereof, the boundary between the tapered part and the large-diameter part is a bottom side thereof, and outside lines of the tapered part are a set of opposing sides thereof.

22. The vehicular steering hanger assembly according to claim 19, wherein
the other vehicle body constituent member is a floor panel positioned below the beam structure; and
the vehicle body connecting member is a member extending from the one beam connecting member to the floor panel.

23. A vehicular steering hanger assembly for supporting a steering column, comprising:
a first beam extending toward a lateral center from a right front pillar;
a second beam extending toward the lateral center from a left front pillar, a distal-end part of the second beam on the center side thereof overlapping with a distal-end part of the first beam on the center side thereof with or without a gap therebetween;
left and right beam connecting members for connecting the mutually overlapping distal-end parts of the first and second beams; and
a floor connecting frame extending downward from any one beam connecting member of the right beam connecting member and the left beam connecting member, and being joined to the floor panel;
the one beam connecting member having:
a first flange joined to an external peripheral surface of one beam of any of the first and second beams and extending from the one beam connecting member so as to follow the external peripheral surface; and
a second flange joined to an external peripheral surface of the other of any of the first and second beams and extending from the one beam connecting member so as to follow the external peripheral surface; and
a beam structure being configured from the first and second beams and the left and right beam connecting members.

24. A vehicular steering hanger assembly for supporting a steering column, comprising:
a first beam extending toward a lateral center from a right front pillar; and
a second beam extending toward the lateral center from a left front pillar, a distal-end part of the second beam on the center side thereof overlapping with a distal-end part of the first beam on the center side thereof;
at least one of the first and second beams comprising a pipe;
the pipe comprising a beam body and a diameter expansion part of the beam body;
the diameter of the diameter expansion part being greater than the diameter of the beam body; and
the diameter expansion part being joined directly to an external peripheral surface of the other of any of the first and second beams.

* * * * *